(12) United States Patent
Wallman

(10) Patent No.: US 9,978,103 B2
(45) Date of Patent: May 22, 2018

(54) METHOD AND APPARATUS FOR PORTFOLIO TRADING USING MARGIN

(75) Inventor: Steven M. H. Wallman, Great Falls, VA (US)

(73) Assignee: FOLIOFN, INC., McLean, VA (US)

( * ) Notice: Subject to any disclaimer, the term of this patent is extended or adjusted under 35 U.S.C. 154(b) by 368 days.

(21) Appl. No.: 12/380,181

(22) Filed: Feb. 24, 2009

(65) Prior Publication Data
US 2009/0259597 A1 Oct. 15, 2009

Related U.S. Application Data

(62) Division of application No. 10/644,891, filed on Aug. 20, 2003.

(60) Provisional application No. 60/404,607, filed on Aug. 20, 2002.

(51) Int. Cl.
*G06Q 40/06* (2012.01)
*G06Q 40/04* (2012.01)
*G06Q 40/08* (2012.01)

(52) U.S. Cl.
CPC ............. *G06Q 40/06* (2013.01); *G06Q 40/04* (2013.01); *G06Q 40/08* (2013.01)

(58) Field of Classification Search
USPC .................................................. 705/37, 36 R
See application file for complete search history.

(56) References Cited

U.S. PATENT DOCUMENTS

| | | | | |
|---|---|---|---|---|
| 5,754,873 | A * | 5/1998 | Nolan ........................... | 715/235 |
| 5,918,218 | A * | 6/1999 | Harris et al. .................... | 705/37 |
| 2001/0042036 | A1* | 11/2001 | Sanders .......................... | 705/36 |
| 2002/0174056 | A1* | 11/2002 | Sefein et al. ................... | 705/37 |
| 2003/0233309 | A1* | 12/2003 | Matus et al. ................... | 705/37 |
| 2004/0064394 | A1* | 4/2004 | Wallman ......................... | 705/36 |
| 2008/0275824 | A1* | 11/2008 | Assia ..................... | G06Q 40/00 705/36 R |
| 2010/0241589 | A1* | 9/2010 | Honorowski .......... | G06Q 40/04 705/36 R |
| 2013/0060603 | A1* | 3/2013 | Wagner .............. | G06Q 30/0202 705/7.29 |

* cited by examiner

*Primary Examiner* — Bruce I Ebersman
(74) *Attorney, Agent, or Firm* — Michael P. Fortkort, Esq.; Michael P Fortkort PC

(57) ABSTRACT

An automated portfolio manager system enables an investor to quickly adjust the underlying risk of the entire portfolio without modifying the underlying investments in the portfolio. A user interface enables the user to adjust the risk of a portfolio of investments without adding or deleting investments from the portfolio by purchasing more or less of the entire portfolio on margin, thereby increasing or decreasing the riskiness of the portfolio. A predetermined portfolio of investments is provided to all investors. Each investor's desired risk/reward characteristic for his or her portfolio is accommodated by determining an appropriate amount of the predetermined portfolio to purchase on margin or an appropriate amount of the user's funds to place in cash reserves or other less risky investment to modify an actual risk/reward characteristic of the portfolio so that it matches the investor's desired risk/reward characteristic without changing the underlying investments.

12 Claims, 61 Drawing Sheets

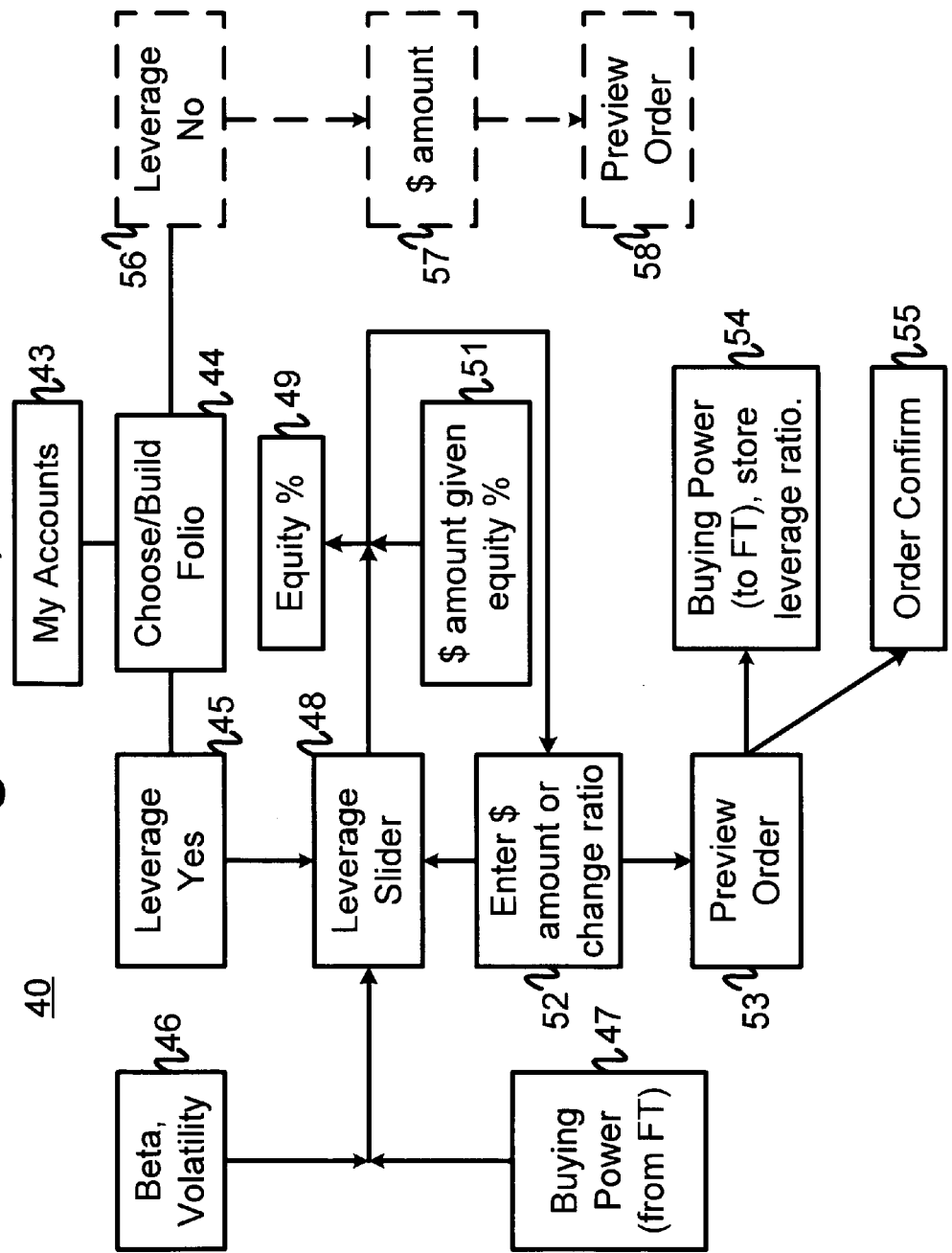
FIG 4 — Leverage Slider, Create a New Folio

Create a Folio: *Prepare Order*

50 Account:

You have chosen the FORTUNE Most Admired Folio.

Cash Available for Trading: $10,000

→ Use Leverage to turbo charge you Folio returns. <u>what is leverage?</u>

( Leverage Slider ) — 59

Enter the dollar amount to invest in this Folio: $ [    ]

Name this Folio: [FORTUNE Most Admired]
(Use no more than 25 characters)

Decide what to do with dividends:
- ⦿ Reinvest dividends of $1 or more in the securities that paid them.
- ◯ Put all dividends in my Cash and Money Funds.

Cash dividends of less than $1 will be deposited in your Cash and Money Funds.

( Preview Order )

FIG. 5

FIG 11 -- Easy Path: Ready-to-go Pre-Leveraged Folios

FOLIO*fn*  Screen Size ▢  Home | Careers | Contact | Press Room | Glossary | FAQs | Site Map | About Us | Help | Search

| FOLIO forum | The Market | Our Services | login required My Accounts | My Profile | | Log Out |

Create a FOLIO: Preview and Place Order    Account: *FOLIOfn 401k*

Explain This Page

Check dollar amount
If it's wrong, go to the "Order" section and click "Cancel" or "Modify."
Provide Tax Information

Due to rounding, the total price of each security may not add up exactly to the order amount.

Sorting
To sort columns, click on headings.
Changes to your Membership and

Order Overview

| Account Name: | FOLIOfn 410k | | Buy: | $500.00 |
| FOLIO Name: | FORTUNE World Admired | | Sell: | $0.00 |
| | | No Commissions on Window Trades: | | $0.00 |

| Trade Type: | Window Trade |
| Order Type: | Dollar-based |
| Cancel Order Limit: | 5.00% |
| Target Leverage: | 25% |

( *Change Preferences* )

Trade Preferences

Please Note: We can cancel your order if its market value changes between the time you place the order and the time it is executed. If you haven't specified a "cancel order limit" we set it for you at 5%. Click on "Change Preferences" to modify your cancel order limit setting.

Since you have chosen a target leverage ratio of 25%, this purchase will be made using margin. Please be aware that there are additional costs associated trading on margin.

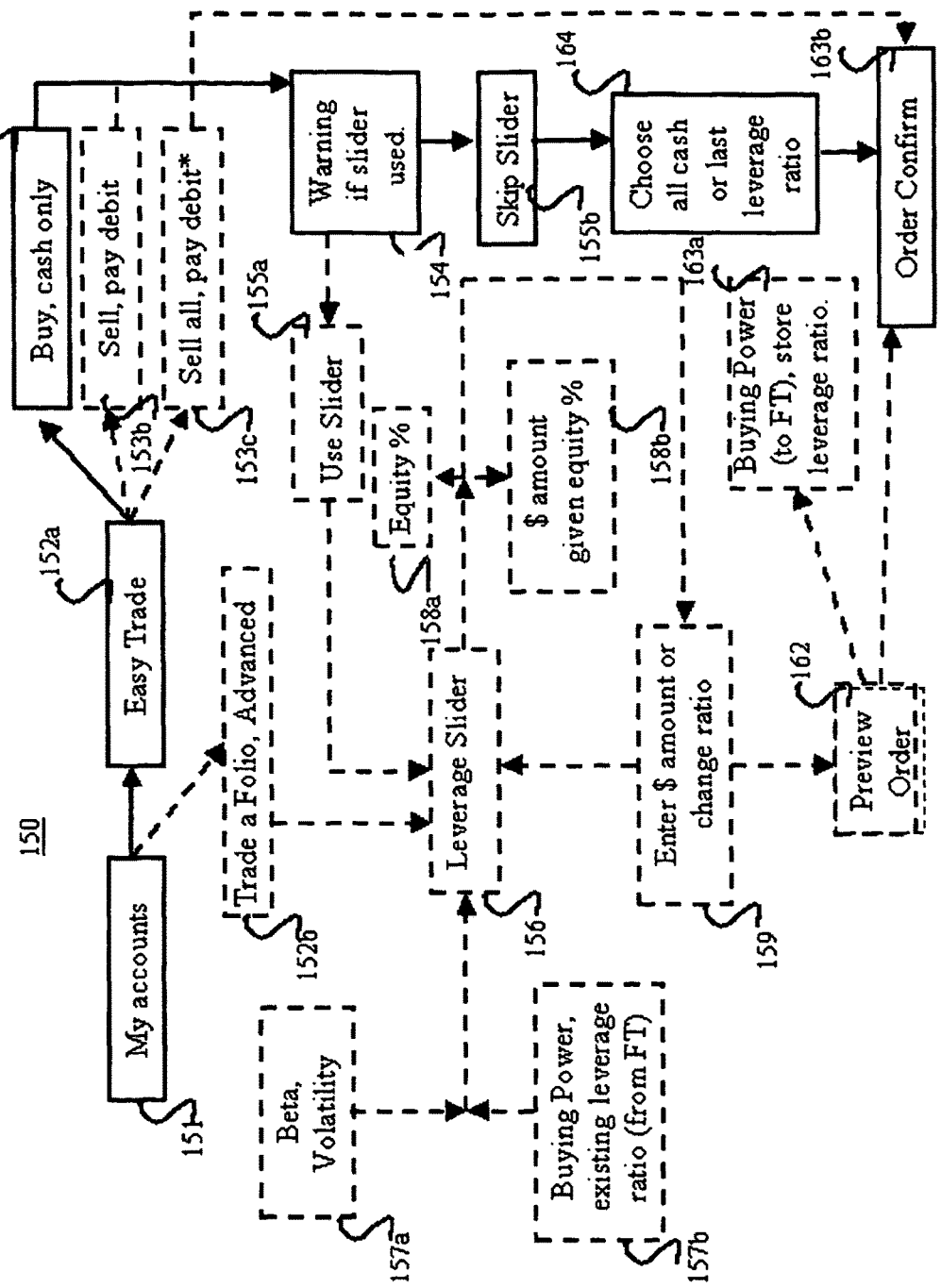
FIG 15 -- Leverage Slider, Easy Trade Buy

Order Overview

| Account Name: | Big Dog | Buy: | ($2,000.00) — 191 |
|---|---|---|---|
| FOLIO Name: | FORTUNE Most Admired | Sell: | $0.00 |

Buy/Sell Details

| Buy using Cash | $2,000.00 ← 192 | Total Sell | $0.00 |
|---|---|---|---|
| Buy using Margin | $0.00 | Sell Paid to Cash | $0.00 |
| Total Buy | $2,000.00 | Sell Paid to Margin | $0.00 |

Margin Details

| Target Margin | $500.00 | Total Equity | $3,500.00 — 194 |
|---|---|---|---|
| Current Margin | $500.00 — 195 | Target Percent Margin | 12.50% — 196 |

193

Other Fees

| | | Commission Fees: | $0.00 |
|---|---|---|---|
| | | SEC Fees: | $0.00 |
| | | Net Change in Cash Fund: | ($2,000.00) — 197 |

FIG. 19

FIG 20 – Leverage Slider, Easy Trade Sell

Order Overview 250

| Account Name: | Big Dog | Buy: | |
|---|---|---|---|
| FOLIO Name: | FORTUNE Most Admired | Sell: | $100.00 |

252, 253

Buy/Sell Details

| Buy using Cash | $0.00 | Total Sell | $100.00 |
|---|---|---|---|
| Buy using Margin | $0.00 | Sell Paid to Cash | $0.00 |
| Total Buy | $0.00 | Sell Paid to Margin | $100.00 |

254

Margin Details

| Target Margin | $400.00 | Total Equity | $3,500.00 |
|---|---|---|---|
| Current Margin | $500.00 | New Percent Margin | 10.26% |

255, 256, 257

Other Fees

| | | Commission Fees: | $0.00 |
|---|---|---|---|
| | | SEC Fees: | $0.00 |
| | | Net Change in Cash Fund: | 0.00 |

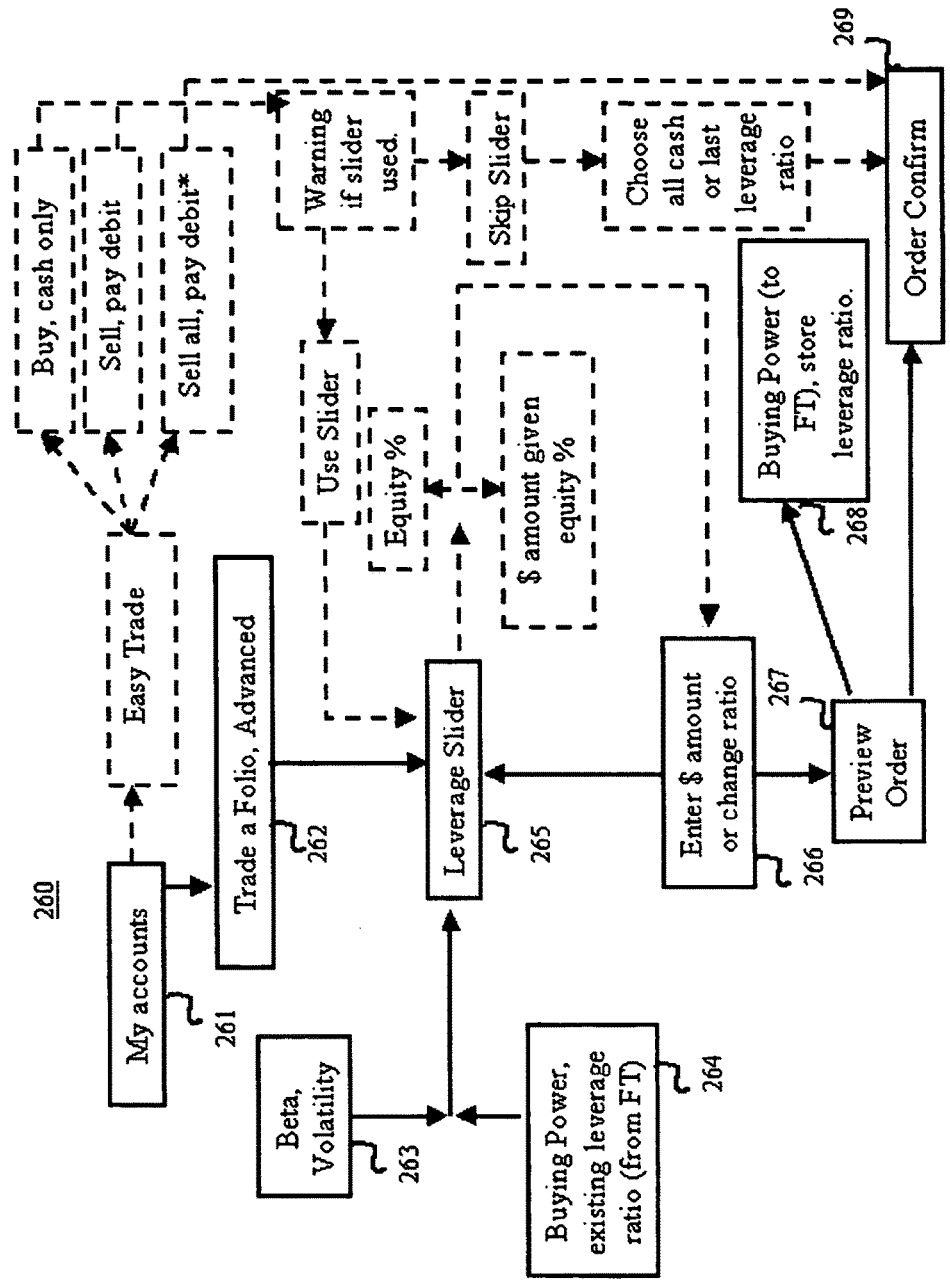
FIG 26 -- Leverage Slider, Advanced Trade

|  | | Past FOLIO | Today's FOLIO | FOLIO Showing Change |
|---|---|---|---|---|
| Rebalance: | Tune-up my FOLIO Buy or sell and change my FOLIO's securities back to the proportions they were. see example | | | |
| Dollar Cost Average: | For buys only Divide the amount of my buy according to the proportions of my FOLIO's securities as they were. see example | | | |
| Custom Modify: | Take total control I want to choose particular securities to buy or sell. see example | | | |
| Exchange: | Update or swap my FOLIO Get the current version of a Ready-to-go FOLIO, or exchange your FOLIO for a Watch FOLIO or a different FOLIO. see example | | | |
| Leverage Slider: | The Power of FOLIO Leverage Use the Folio Leverage Slider to change the expected risk and returns without changing the proportions. see example | | | |

FIG. 27

Order Overview — 330

| Account Name: | Big Dog | Buy: | $2,000.00 — 331 |
|---|---|---|---|
| FOLIO Name: | FORTUNE Most Admired | Sell: | |

Buy/Sell Details

| Buy using Cash | $500.00 — 332 | Total Sell | $0.00 |
| Buy using Margin | $1,500.00 — 333 | Sell Paid to Cash | $0.00 |
| Total Buy | $2,000.00 — 334 | Sell Paid to Margin | $0.00 |

Margin Details

| Target Margin | $2,000.00 | Total Equity | $2,000.00 |
| Current Margin | $500.00 — 335, 336 | New Percent Margin | 50.00% |

Other Fees

| | | Commission Fees: | $0.00 |
| | | SEC Fees: | $0.00 |
| | | Net Change in Cash Fund: | ($500.00) |

FIG. 33

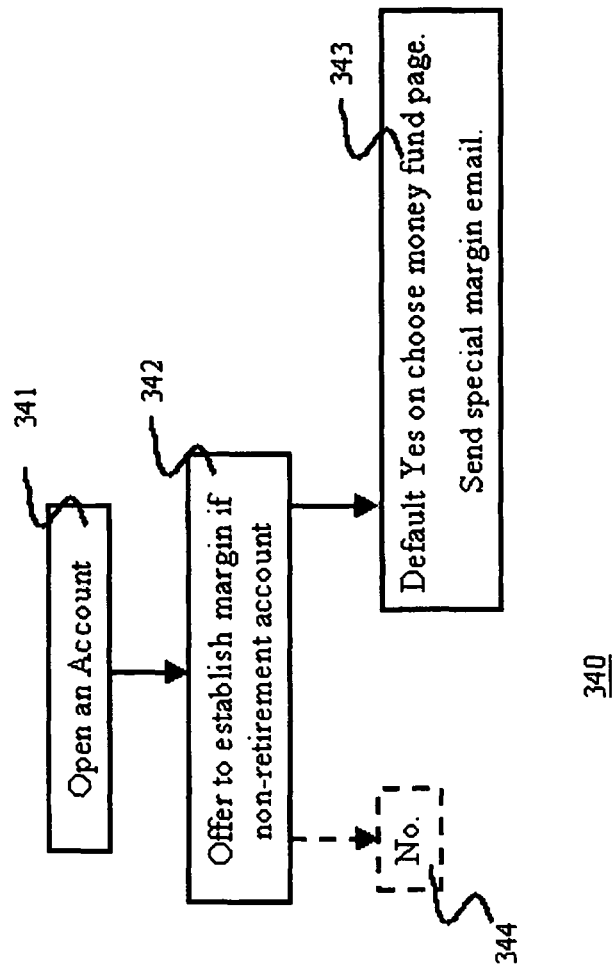
FIG 34 -- Margin and Account Opening

Open Your Account: *Money Management* 350

Fund for Cash

Please choose a fund to keep your cash in. By selecting a fund, you agree that you have read and understand the fund prospectus.

For best results, you will need Adobe®Acrobat®Reader 4.0 or higher to view and print the prospectus. If Acrobat is installed on your computer, the program will automatically launch when you click on the prospectus. If you need to intsall Acrobat, click the "Get Acrobat Reader" button.

Please select a fund:

○ General Money Market Fund
○ Municipal Money Market Fund
○ U.S. Government Fund

Margin

Please be sure you have read the customer agreement and understand the risks of investing on margin. Click here for more info.

⊙ Allow margin in this account. — 351
○ Do not allow margin in this account.

FIG. 35

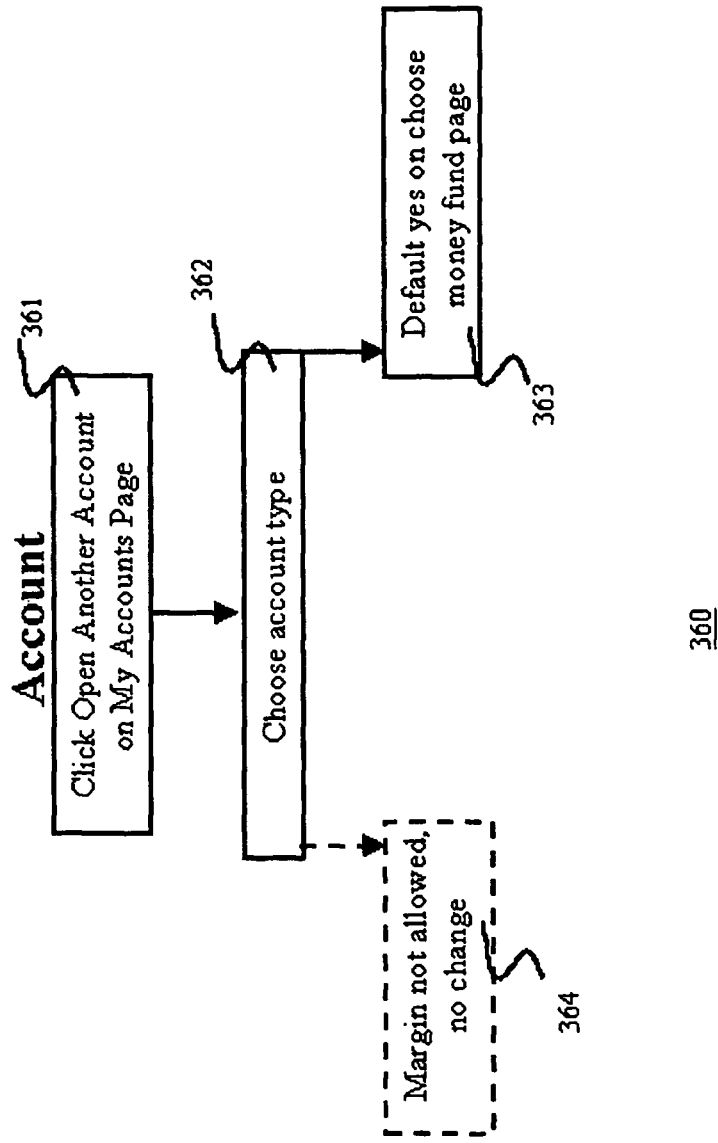
FIG 36 -- Margin and Add New (additional) Account

Open Your Account: *Money Management*  370

Fund for Cash

Please choose a fund to keep your cash in. By selecting a fund, you agree that you have read and understand the fund prospectus.

For best results, you will need Adobe®Acrobat®Reader 4.0 or higher to view and print the prospectus. If Acrobat is installed on your computer, the program will automatically launch when you click on the prospectus. If you need to intsall Acrobat, click the "Get Acrobat Reader" button.

  Get Acrobat Reader

Please select a fund:

○ General Money Market Fund
○ Municipal Money Market Fund
○ U.S. Government Fund

Margin

Please be sure you have read the customer agreement and understand the risks of investing on margin. Click here for more info.

⊙ Allow margin in this account.   — 371
○ Do not allow margin in this account.

FIG. 37

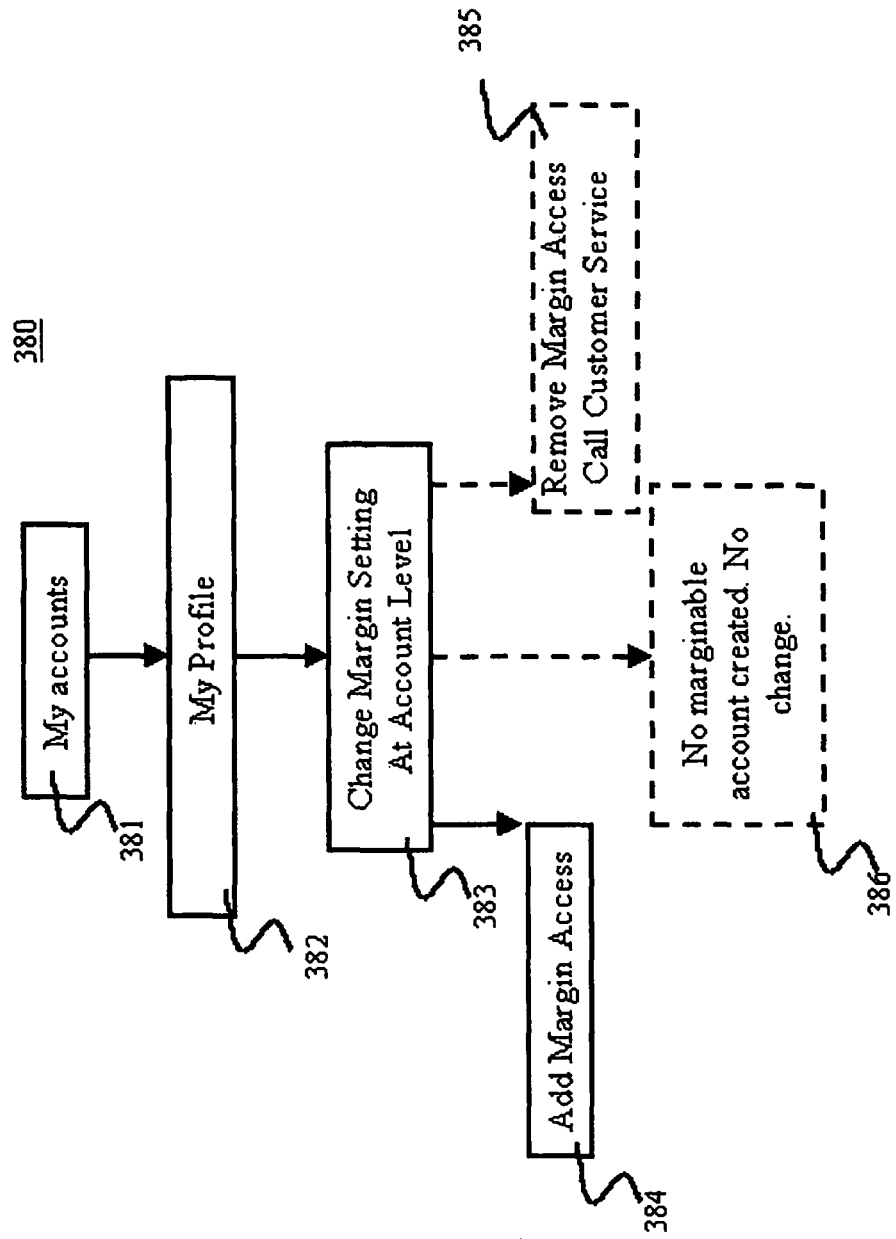
FIG 38 – Margin Profile

Account information
390

Account Name: Jay's Day Trader (#MA00007003)
KJ Papp
Jason Rockelein (TIC)
Mt Access Level: Account Creator
Change: Account Name | Cancel Order Limit | Stock Exclusions | Add Margin
Tax Lot Selection | Fund for Cash | Close Account 📁 231 FOLIO (#MA0000700323)
Change: FOLIO Name | Dividend | Close FOLIO 📁 Dow FOLIO (#MA0000700330)
Change: FOLIO Name | Dividend | Close FOLIO

Account Name: Jay's IRA (#MA00000001)
KJ Papp
Jason Rockelein (TIC)
Mt Access Level: Account Creator
Change: Account Name | Cancel Order Limit | Stock Exclusions | Close Account
Tax Lot Selection | Fund for Cash | Close Account 📁 231 FOLIO (#MA0000700323)
Change: FOLIO Name | Dividend | Close FOLIO

FIG. 39

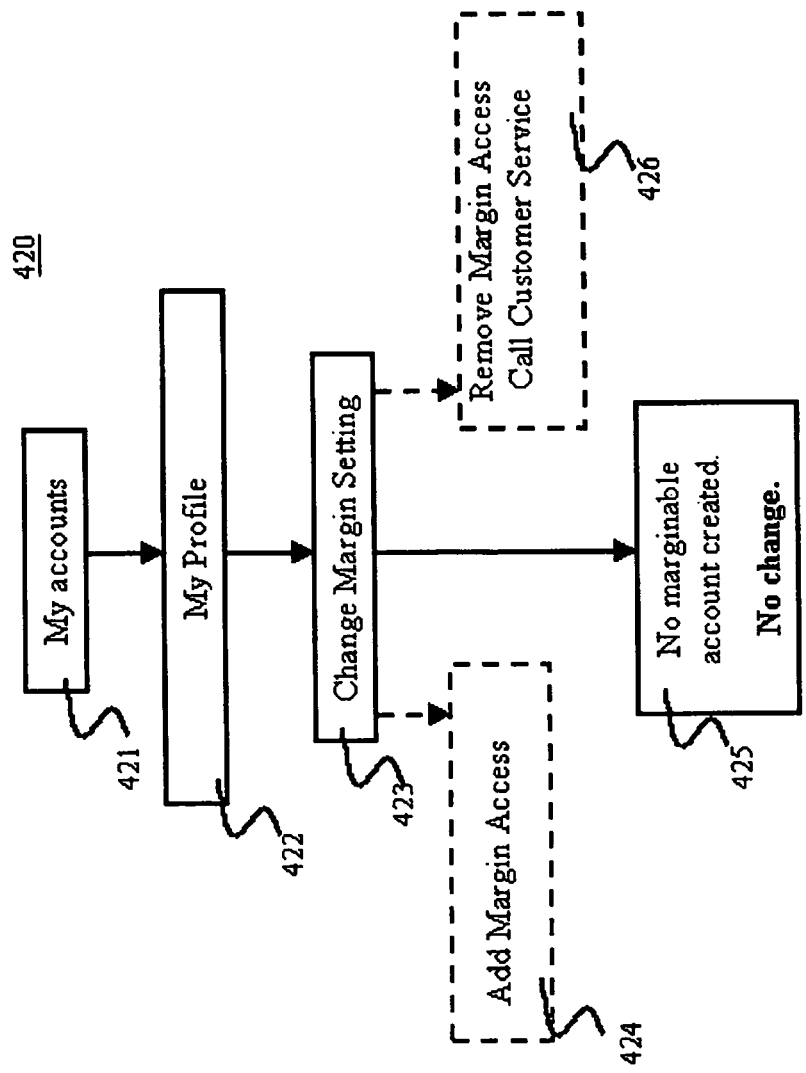

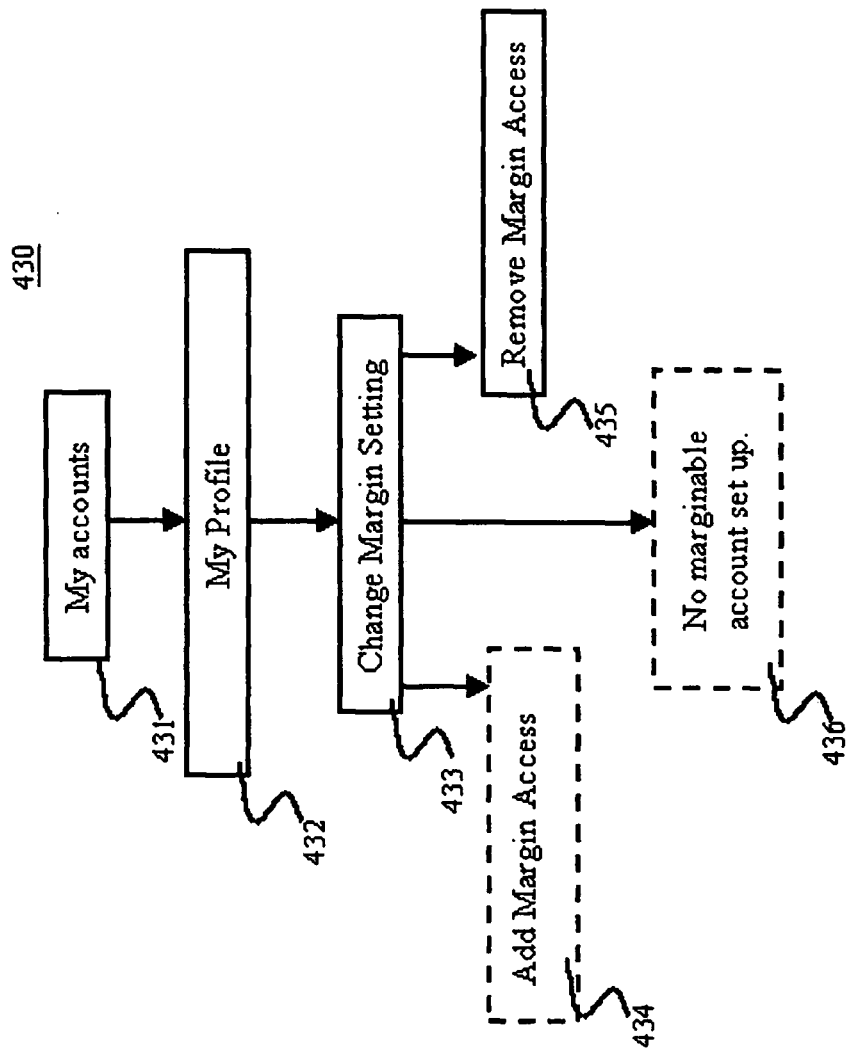

Account information                                                     440

Account Name: Jay's Day Trader (#MA00007003)
KJ Papp
Jason Rockelein (TIC)
My Access Level: Account Creator
Change: Account Name | Cancel Order Limit | Stock Exclusions | Remove Margin
Tax Lot Selection | Fund for Cash | Close Account 📁 231 FOLIO (#MA0000700323)
Change: FOLIO Name | Dividend | Close FOLIO 📁 Dow FOLIO (#MA0000700330)
Change: FOLIO Name | Dividend | Close FOLIO

Account Name: Jay's IRA (#MA00000001)
KJ Papp
Jason Rockelein (TIC)
My Access Level: Account Creator
Change: Account Name | Cancel Order Limit | Stock Exclusions
Tax Lot Selection | Fund for Cash | Close Account 📁 231 FOLIO (#MA0000700323)
Change: FOLIO Name | Dividend | Close FOLIO

FIG. 44

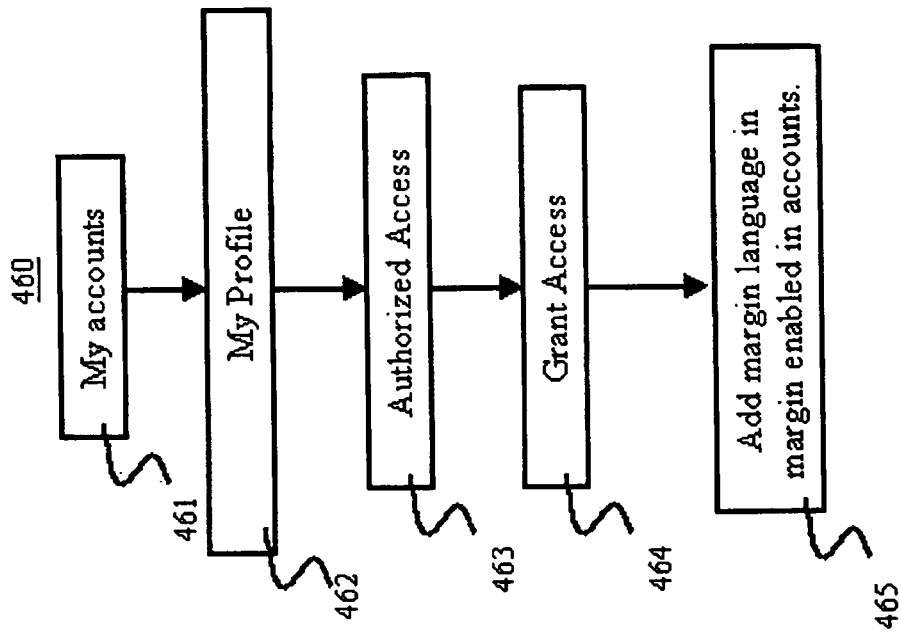
FIG 46 -- Margin Profile

470

To grant another FOLIOfn member access to your account, please enter the member's user name, date of birth, and the access level you want to grant.

Grant access to this account: [dropdown]

Grant access to this member:
Please enter the member's user name: [field]

Please enter the member's date of birth: [ ] / [ ] / [ ] (mm/dd/yyyy)

Please select an access level:

○ Account Manager more info
Can view the account, trade, transfer money, and vote proxies.  →  trade on margin.

○ Trader more info
Can view the account, trade, transfer money.

○ Money Mover more info
Can view the account and transfer money.  →  including available to withdraw ○ Detail Level Viewer more info
Can view the account details, such as balances, transaction history, order status, and holdings.

○ Summary Level Viewer more info
Can view the total balance and the FOLIO balances.

FIG. 47

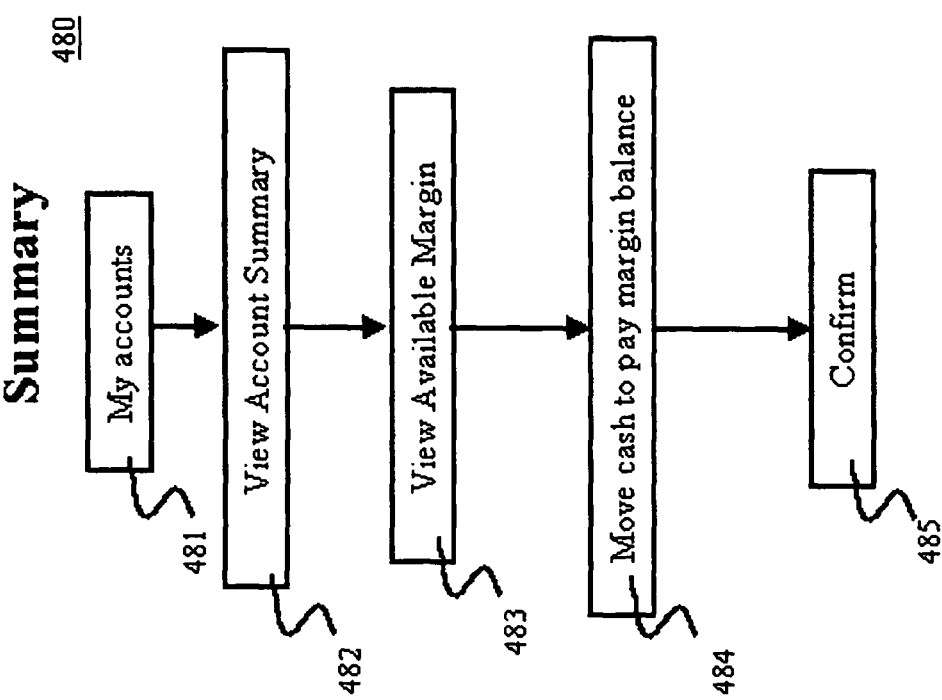
FIG 48 – Margin and Account Summary

| Name | Current Market Value | | Actions | |
|---|---|---|---|---|
| Big Dog (#EA0001500U) | ⊕DIRECT TRADE | ⊕ CREATE FOLIO | Create a New Folio ▷ | GO |
| 🗀 Folio Holdings | | | | |
| Folio | | $5,000.00 | Prepare a Window Trade ▷ | GO |
| Non-Folio Holdings | | $0.00 | Prepare a Direct Trade ▷ | GO |
| Cash & Money Funds | | $20,000.00 | Set up EFT ▷ | GO |
| Outstanding Margin Balance | | ($5,000.00) ← 491 | | |
| Total Market Value | | $20,000.00 | | |

View Summary: 500    Change View to:      ( Go ⇧ )

| | Current Market Value | Previous Close | Change | YTD Return |
|---|---|---|---|---|
| Total Value (#EA0001500U) | $20,000.00 | $20,000.00 | | |
| Securities | $0.00 | $0.00 | | |
| 📁 Folio Holdings | | | | |
| Folio | $5,000.00 | $5,000.00 | | |
| Folio Margin Balance | ($5,000.00) | ($5,000.00) —— 501 | | |
| Cash & Money Funds (Net) | | | | |
| Cash & Money Funds (Total) | $20,000.00 | $20,000.00 | | |
| Pending Cash | $0.00 | $0.00 | | |
| Available to Borrow | $15,000.00 | $15,000.00 —— 502 | | |
| Buying Power | $30,000.00 | $30,000.00 —— 503 | | |
| Total Margin Balance | ($5,000.00) | ($5,000.00) —— 504 | | |
| Total Value | $20,000.00 | $20,000.00 | | |

Want to see our Ready-to-go Folios?

Pick a Ready-to-go Folio & change it if you want
- Featured Folios See a collection of our popular pre-packaged Folios.
- Categories of Folios Explore Folios by market indexes, sectors, and other major categories.
- All our Folios Browse through our Folios in alphabetical order.

Want to build your ownFolio?

Build your own Folio
- Stock-by-Stock Put your own stock picks into a Folio.
- Stock Selector Use tools to screen stocks.
- Beta Selector See the Folios that match your tolerance for risk.
- Internal Stock Transfer Transfer stocks into a new Folio or between Folios.

Want to send an order directly to the market?

Place a Market Order
Use Direct Trade to place a market order for $14.95 per security outside of a Folio. (To place a market order for a Folio, select your Folio and on the "Preview and Place Order" page you can change from a Window Trade to a Direct Trade.)

*Return To My Accounts*

FIG. 53

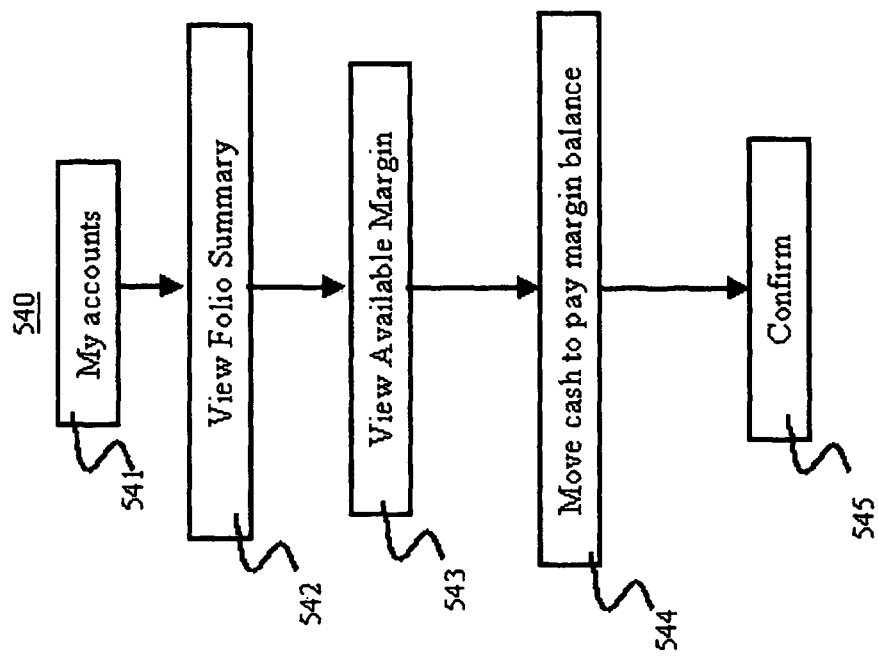
FIG 54 – Margin and Folio Summary

| Name | Current Market Value | | Actions | |
|---|---|---|---|---|
| Big Dog (#EA0001500U) | ⊹DIRECT TRADE | ⊹CREATE FOLIO | Create a New Folio ▷ | GO |
| 📁 Folio Holdings | | | | |
| Folio | | $5,000.00 | Prepare a Window Trade ▷ | GO |
| Non-Folio Holdings | | $0.00 | Prepare a Direct Trade ▷ | GO |
| Cash & Money Funds | | $20,000.00 | Set up EFT | GO |
| Outstanding Margin Balance | | ($15,000.00) | | |
| Total Market Value | | $20,000.00 | | |

| | Current Market Value | Previous Close | Change | YTD Return |
|---|---|---|---|---|
| Folio Suppliers | $5,000.00 | $5,000.00 | | |
| Outstanding Margin Balance | ($5,000.00) —561 | ($5,000.00) —562 | | |

| Action | Description |
|---|---|
| View Transaction History | Provides detailed transaction history |
| View Proportions | View your Folio's current proportions and target proportions - use our tools to set new target proportions |
| View Holdings | Provides detailed holdings information |
| View Order Status | Provides Order details for all accounts |
| View Tax Information | Provides tax lots and cost basis detail |
| View Performance | Compares your performance against a specified benchmark |
| Reduce Margin Balance | Use cash available to reduce your margin balance |

FIG 59 -- View/Change Proportion and Margin

**Order Status: *Analyst Growth***    610        Change View to: [Analyst Growth ▽] (Go ⇧)

BOTTOM OF PAGE ▶

Open Orders

| Order Date [Action] | Status | Order# | Account FOLIO | Trade Type | Trade Description |
|---|---|---|---|---|---|
| 04/24/2001 Easy Buy/Sell [cancel \| modify] | Pending | 0001CQ3E | Jay's Day Trader Analyst Growth | Dollar-based Window 10:00 PM 12/31/2001 | Dollar Based buy: $500 Cash $500 Margin |

611

Closed Orders

| Date [Action] | Status | Order# | Account FOLIO | Trade Type | Trade Description |
|---|---|---|---|---|---|
| 03/19/2001 Easy Buy/Sell | Cancelled | 00016SAO | Jay's Day Trader Analyst Growth | Dollar-based Window Buy 10:00 PM 03/20/2001 | Buy: $50.00 |

FIG. 61

METHOD AND APPARATUS FOR PORTFOLIO TRADING USING MARGIN

RELATED APPLICATIONS

This divisional application claims the benefit of priority from U.S. patent application Ser. No. 10/644,891, filed Aug. 20, 2003, having the same title and inventor, which in turn claims priority from U.S. Provisional Application No. 60/404,607, filed Aug. 20, 2002, having the same title and inventor, both of which applications are incorporated herein by reference in their entirety, including the drawings.

The present invention is related to U.S. patent application Ser. No. 09/038,158, entitled "Method and Apparatus for Enabling Smaller Investors or Others to Create and Manage a Portfolio of Securities or Other Assets or Liabilities on a Cost Effective Basis," filed on Mar. 11, 1998. The present invention also is related to U.S. patent application Ser. No. 09/139,020, entitled "Method and Apparatus for Enabling Smaller Investors or Others to Create and Manage a Portfolio of Securities or Other Assets or Liabilities on a Cost Effective Basis," filed on Aug. 24, 1998. In addition, the present invention is related to U.S. patent application Ser. No. 09/339,299, entitled "Method and System for Investing in a Group of Securities that Are Selected Based on the Aggregated, Individual Preferences of Plural Investors," filed on Jun. 24, 1999. Furthermore, the present invention is related to U.S. patent application Ser. No. 09/572,694, entitled "On-Line Investment Club," filed on May 16, 2000. Moreover, the present invention is also related to U.S. Provisional Patent Application No. 60/341,459 entitled "Portfolio Manager With Automated Investment Deselection," filed Dec. 13, 2001; U.S. Provisional Patent Application No. 60/332,348 entitled "Method and Apparatus For Creating Investment Advice Marketplace," filed Nov. 15, 2001; U.S. Provisional Patent Application No. 60/332,351 entitled "Method and Apparatus For Providing Investment Advice to Multiple Investors, filed Nov. 15, 2001; U.S. Provisional Patent Application No. 60/333,982 entitled "Method and Apparatus For Rebalancing an Investment Portfolio Using A Portfolio Investment System," filed Nov. 28, 2001.

Each of these applications was filed by the inventor of the present invention. U.S. patent application Ser. Nos. 09/038,158; 09/139,020; 09/339,299 and 09/572,694 are each hereby incorporated by reference as if repeated herein in their entirety, including the drawings. In addition, U.S. Provisional Patent Application Nos. 60/332,348; 60/332,351; 60/333,982 and 60/341,459 are each hereby incorporated by reference as if repeated herein in their entirety, including the drawings.

FIELD OF THE INVENTION

The invention described herein relates generally to methods and apparatuses for investing in investment portfolios as a whole, wherein the underlying individual investments are important only in as they contribute to the overall characteristics of the portfolio.

BACKGROUND OF THE INVENTION

The above mentioned patent applications disclose several methods and apparatuses for enabling individual or smaller investors to create and invest in diversified investment portfolios from the first investment in a cost-effective manner.

As investors begin viewing their investment portfolios as a single entity, with specific characteristics and performances, they will be more interested in the actual portfolio characteristics rather than the characteristics of the underlying investments. Typically, to modify the portfolio characteristics by modifying the underlying investments may cause tax consequences and other undesirable effects.

The present invention is therefore directed to the problem of developing a method and apparatus for enabling investors to readily modify the investment characteristics of their investment portfolio without changing the actual investments in the portfolio.

SUMMARY OF THE INVENTION

The invention solves these and other problems by providing an interface to an automated portfolio manager system that enables an investor or portfolio manager to quickly adjust the underlying risk of the entire portfolio without incurring any tax liability.

According to one aspect of the present invention, the user interface enables the user to adjust the risk (e.g., beta) of a portfolio of investments without adding or deleting investments from the portfolio by purchasing more or less of the entire portfolio on margin, thereby increasing or decreasing the riskiness of the portfolio.

According to one aspect of the present invention, a predetermined portfolio of investments is provided to all investors. Each investor's desired risk/reward characteristic for his or her portfolio is accommodated by determining an appropriate amount of the predetermined portfolio to purchase on margin or an appropriate amount of the user's funds to place in cash reserves to modify an actual risk/reward characteristic of the portfolio so that it matches the investor's desired risk/reward characteristic without changing the underlying investments. Moreover, this modification can be accomplished by interacting with the user in a simple manner, e.g., via a graphical user interface, that helps the user select a particular risk/reward characteristic, which is then used to calculate the above required values. Furthermore, the complexities of purchasing on margin and determining the appropriate cash reserves are hidden from the user, thereby enabling the user to focus on the portfolio characteristics rather than the trading exigencies.

BRIEF DESCRIPTION OF THE DRAWINGS

FIG. 4 depicts an exemplary embodiment of a flow chart of web pages for interacting with a user to create a new portfolio of assets, rights and/or liabilities with user specifiable leverage as part of a graphical user interface for use in the apparatus of FIG. 3 according to another aspect of the present invention.

FIG. 5 depicts an exemplary embodiment of a web page for use in the graphical user interface set forth in FIG. 4.

FIGS. 12-14 depict exemplary embodiments of web pages for use in the graphical user interface set forth in FIG. 11.

FIG. 15 depicts an exemplary embodiment of a flow chart of web pages for interacting with a user to purchase a pre-existing portfolio of assets, rights and/or liabilities without leverage (even though a prior purchase may have been made using leverage) as part of a graphical user interface for use in the apparatus of FIG. 3 according to another aspect of the present invention.

FIGS. 16-19 depict exemplary embodiments of web pages for use in the graphical user interface set forth in FIG. 15.

FIGS. 21-25 depict exemplary embodiments of web pages for use in the graphical user interface set forth in FIG. 20.

FIG. 26 depicts an exemplary embodiment of a flow chart of web pages for interacting with a user to trade a pre-existing portfolio of assets, rights and/or liabilities using leverage as part of a graphical user interface for use in the apparatus of FIG. 3 according to another aspect of the present invention.

FIGS. 27-33 depict exemplary embodiments of web pages for use in the graphical user interface set forth in FIG. 26.

FIG. 34 depicts an exemplary embodiment of a flow chart of web pages for interacting with a user to open an account in which margin may be used to trade a portfolio of assets, rights and/or liabilities as part of a graphical user interface for use in the apparatus of FIG. 3 according to another aspect of the present invention.

FIG. 35 depicts an exemplary embodiment of a web page for use in the graphical user interface set forth in FIG. 34.

FIG. 36 depicts an exemplary embodiment of a flow chart of web pages for interacting with a user to add an additional account to an existing account in which margin may be used to trade a portfolio of assets, rights and/or liabilities as part of a graphical user interface for use in the apparatus of FIG. 3 according to another aspect of the present invention.

FIG. 37 depicts an exemplary embodiment of a web page for use in the graphical user interface set forth in FIG. 36.

FIG. 38 depicts an exemplary embodiment of a flow chart of web pages for interacting with a user to edit a user's margin profile when managing or trading a portfolio of assets, rights and/or liabilities as part of a graphical user interface for use in the apparatus of FIG. 3 according to another aspect of the present invention.

FIGS. 39-41 depict exemplary embodiments of web pages for use in the graphical user interface set forth in FIG. 38.

FIG. 42 depicts an exemplary embodiment of a flow chart of web pages for interacting with a user to change a user's margin settings when managing a portfolio of assets, rights and/or liabilities as part of a graphical user interface for use in the apparatus of FIG. 3 according to another aspect of the present invention.

FIG. 43 depicts an exemplary embodiment of a flow chart of web pages for interacting with a user to change a user's margin settings when managing a portfolio of assets, rights and/or liabilities as part of a graphical user interface for use in the apparatus of FIG. 3 according to another aspect of the present invention.

FIGS. 44-46 depict exemplary embodiments of web pages for use in the graphical user interface set forth in FIG. 43.

FIG. 46 depicts an exemplary embodiment of a flow chart of web pages for interacting with a user to enable a user to grant access to the user's margin profile to a third party when managing and/or trading a portfolio of assets, rights and/or liabilities as part of a graphical user interface for use in the apparatus of FIG. 3 according to another aspect of the present invention.

FIG. 47 depicts an exemplary embodiment of a web page for use in the graphical user interface set forth in FIG. 46.

FIG. 48 depicts an exemplary embodiment of a flow chart of web pages for interacting with a user to enable a user to view the user's account summary and available margin when managing a portfolio of assets, rights and/or liabilities as part of a graphical user interface for use in the apparatus of FIG. 3 according to another aspect of the present invention.

FIGS. 49-53 depict exemplary embodiments of web pages for use in the graphical user interface set forth in FIG. 48.

FIG. 54 depicts an exemplary embodiment of a flow chart of web pages for interacting with a user to enable a user to view the user's margin and folio summary when managing a portfolio of assets, rights and/or liabilities as part of a graphical user interface for use in the apparatus of FIG. 3 according to another aspect of the present invention.

FIGS. 55-58 depict exemplary embodiments of web pages for use in the graphical user interface set forth in FIG. 54.

FIG. 61 depicts an exemplary embodiment of a web page for use in the graphical user interface set forth in FIG. 60.

DETAILED DESCRIPTION

Figure 1:
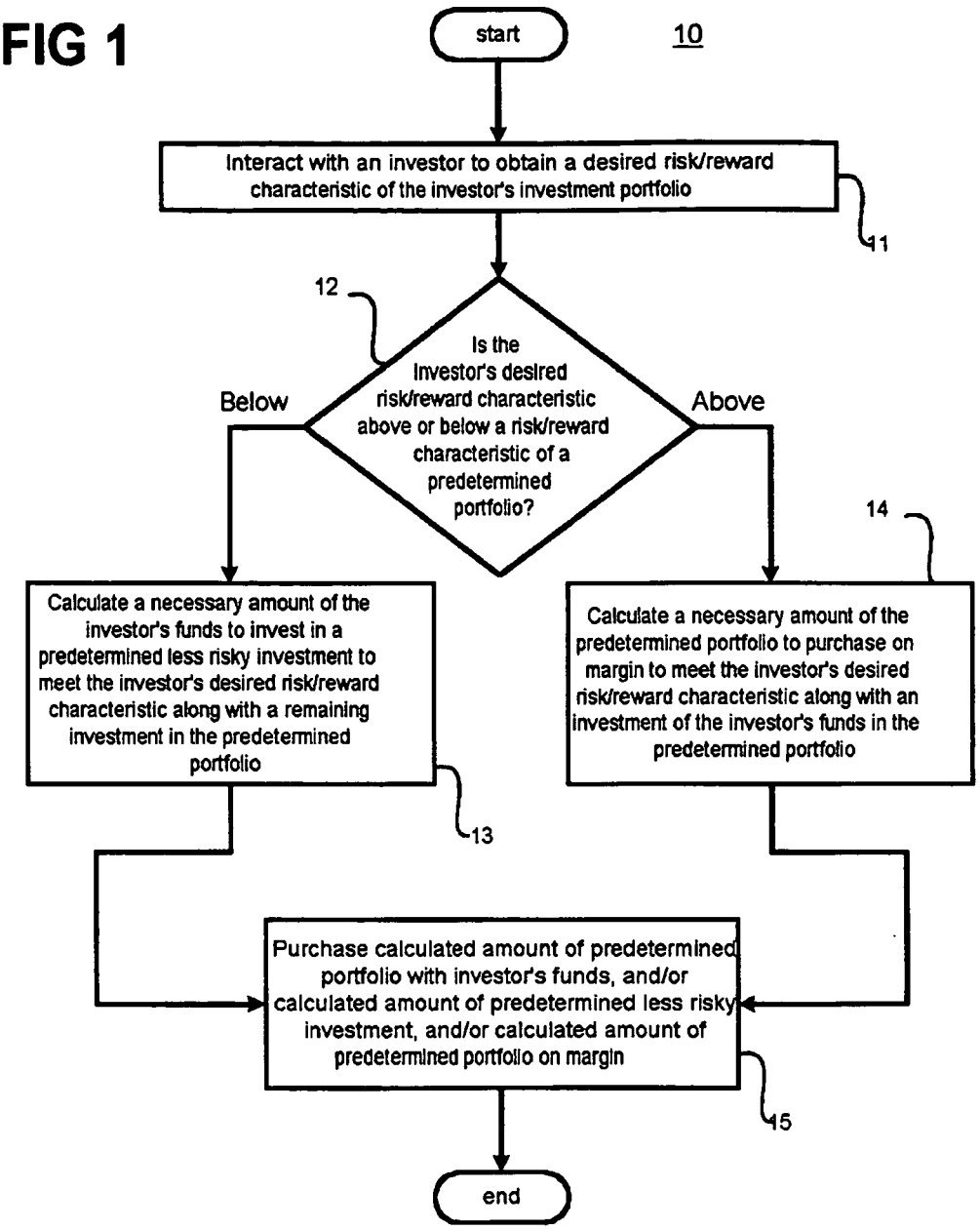
FIG. 1 depicts a flow chart of an exemplary embodiment of a method for purchasing an investment portfolio according to one aspect of the present invention.

Any reference herein to "one embodiment" or "an embodiment" means that a particular feature, structure, or characteristic described in connection with the embodiment is included in at least one embodiment of the invention. Use of the phrase "in one embodiment" in various places in the specification is not necessarily all referring to the same embodiment.

As used herein, the phrase "asset/right/liability" refers to any tradable commodity or item of value in which there exists a market, however small, for trading. Examples include: securities, equities, bonds, futures, mutual funds, derivatives, currencies (both national and foreign), commodities, insurance contracts, mortgages, bonds, high-yield debt, foreign debt, convertible debt, notes, pollution rights, development rights, leases, loans, real estate investment trusts, etc. Although the computer-based system of the present invention can be used for any market tradable asset, right, and/or liability, for brevity the discussion herein relates primarily to its use in connection with tradable instruments or securities, and particularly to stocks. The phrase "assets, rights or liabilities" refers to any collection of assets, rights or liabilities.

As used herein, the phrase "manager" refers to any person or group of persons who manages the assets of a collectively owned investment account. For example, a manager can be one member of an investment club or multiple members of an investment club acting in concert. Furthermore, all the members collectively could perform the manager's role. In addition, a manager could be a professional, as in the case of a professional asset manager that is employed by an investment club, mutual fund, or hedge fund. A manager can also be someone whose advice the collective account follows, etc., but who is not actually employed by the collectively owned account. Moreover, a manager can manage one or more collectively owned accounts.

One aspect of the present invention provides a simple user interface through which a user (e.g., either the investor himself or a manager) can purchase entire portfolios of assets, rights and/or liabilities on margin. By enabling a user to quickly and simply provide a margin to equity ratio to the system for creating, managing and trading portfolios of assets, rights and/or liabilities the present invention brings this high-powered investment tool to the smaller and individual investor for the first time.

According to an exemplary embodiment of the present invention, a user interface is provided that enables an investor or manager of an investment account to modify the risk (i.e., beta) of an investment portfolio in which the investor or manager desires to invest. Once the investor or manager has established the level of risk that the investor or manager prefers, the system calculates the necessary level of leveraging required to increase the beta of the portfolio to the established level. By purchasing some of the portfolio on margin, the inherent riskiness of the portfolio is increased. The riskiness of the portfolio is a function of the combined risk of the underlying investments, the amount of the investor's principal and the total investment (i.e., $\beta=f(\beta_p,P,I)$ where $\beta$ is the resulting riskiness of the portfolio invested in, $\beta_p$ is the combined riskiness of the underlying investments, P is the principle of the investment made by the investor, and I is the overall investment amount, which includes P plus the amount borrowed.

Turning to FIG. 1, shown therein is an exemplary embodiment of a method for providing a portfolio investment system to multiple investors using a single predetermined investment portfolio having a known risk/reward characteristic while enabling each investor to obtain a resulting investment portfolio that has a risk/reward characteristic specified by the investor. In this exemplary embodiment, the system has a predetermined investment portfolio that includes multiple investments, each of which has preset weights relative to the entire portfolio. The predetermined investment portfolio has a certain risk/reward characteristic, which may or may not be desired by a given investor. The system also uses a predetermined less risky investment vehicle, such as a cash reserve or money market fund with a very low risk/reward characteristic, which can be used in a calculated ratio with some of the user's investment funds to reduce the risk/reward characteristic from its existing value to a lower value. In addition, the system includes a mechanism for enabling each investor to purchase on margin some of the predetermined investment portfolio to increase the risk/reward characteristic to that specified by the user. The exemplary method operates as follows.

First, in step 11 the system obtains from the investor (or another user on behalf of the investor, such as a manager of an investment portfolio for an investor) a desired risk/reward characteristic of a resulting portfolio. Of course, the system also obtains other investment information, such as identification information, an investment amount, etc.

Next, in step 12, the system compares the investor specified risk/reward characteristic with the risk/reward characteristic of the predetermined portfolio.

If the investor specified risk/reward characteristic is below that of the predetermined portfolio, then the system must decrease the risk/reward characteristic of the resulting portfolio. This can be accomplished in step 13 by calculating a certain amount of the investor's funds must be placed in the predetermined less risky investment (e.g., cash reserves) so that the overall investment has the investor's desired risk/reward characteristic. By placing some of the investor's funds in the predetermined less risky investment, the resulting investment portfolio's value will fluctuate less relative to the amount invested by the investor, thereby decreasing the resulting investment portfolio's beta (or risk/reward characteristic) as compared to that of the underlying predetermined investment portfolio.

If the investor specified risk/reward characteristic is above that of the predetermined portfolio, then the system must increase the risk/reward characteristic of the resulting portfolio. This can be accomplished in step 14 by calculating a certain amount of the predetermined portfolio that must be purchased on margin (i.e., on credit) so that the overall investment has the investor's desired risk/reward characteristic. By purchasing some of the predetermined portfolio on margin, the resulting investment portfolio's value will fluctuate more relative to the amount invested by the investor, thereby increasing the resulting investment portfolio's beta (or risk/reward characteristic) as compared to that of the underlying predetermined investment portfolio.

Once the appropriate amounts of the investor's funds that must be invested in the predetermined portfolio, the less risky investment, if any, and the amount on margin, if any, are calculated, the system then purchases the necessary amounts of each in step 15.

If desired by an individual investor, a feature can be implemented that tracks the beta of the investor's portfolio and continually modifies the amounts invested in the predetermined portfolio, the less risky investment and the amount of the predetermined portfolio purchased on margin based on market fluctuations. As these market fluctuations vary outside investor specified parameters, new amounts for each of the three categories can be calculated. Once these amounts are determined, the system can then automatically implement the necessary amounts by investing more of the investor's funds, placing more of the predetermined portfolio in the less risky investment vehicle or purchasing more of the predetermined portfolio on margin. If some of these actions require a sale of an amount of the predetermined portfolio, the system can require investor authorization to proceed to prevent undesirable taxable events. Moreover, the system can notify the investor of an amount of funds that must be infused into the overall investment portfolio to modify the beta to the investor specified level.

Figure 2:
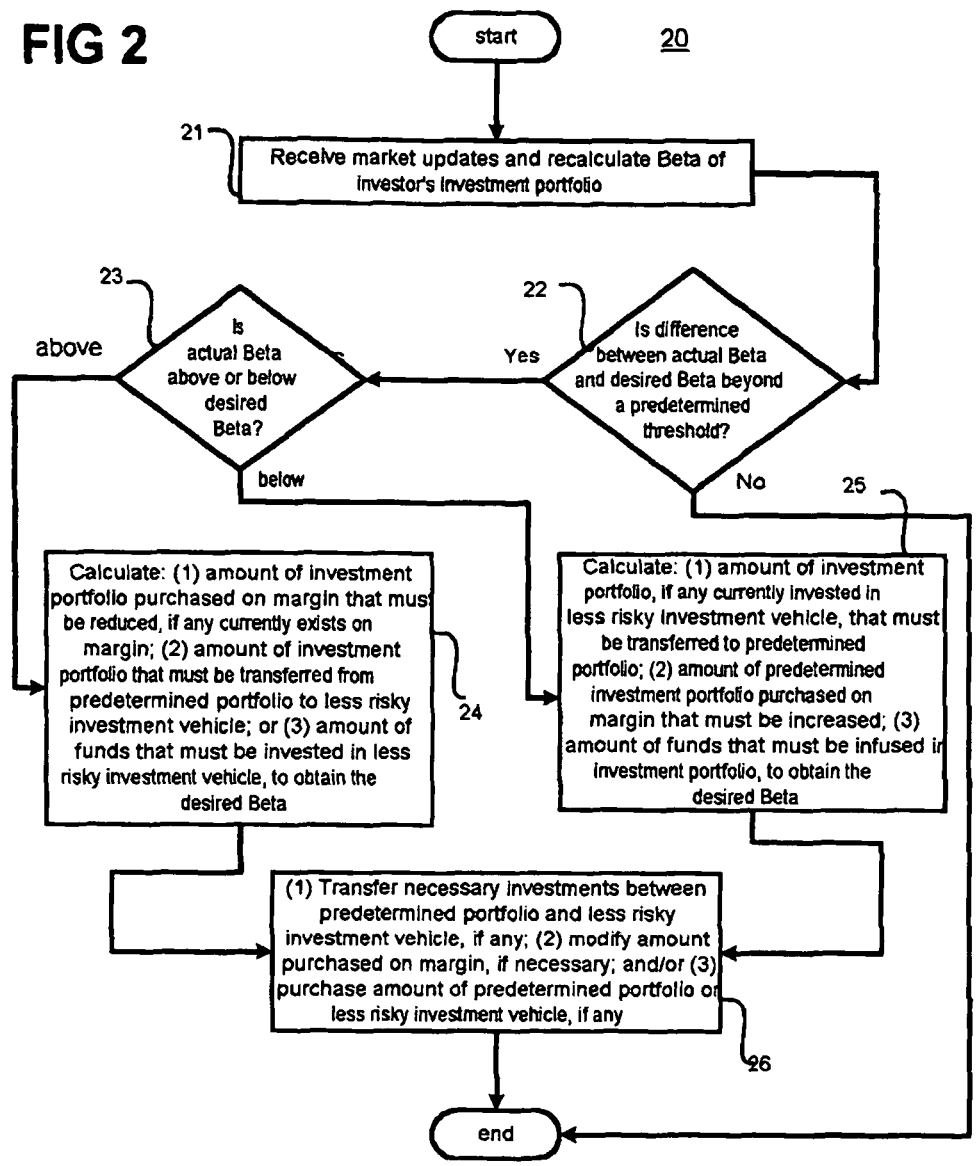
FIG. 2 depicts a flow chart of an exemplary embodiment of a method for monitoring an investment portfolio once set up in accordance with the embodiment of FIG. 1.

FIG. 2 depicts an exemplary embodiment of a method for monitoring an investment portfolio that was established using the embodiment shown in FIG. 1. Any such investment portfolio includes potentially three elements—some funds invested in the predetermined portfolio, some funds invested in a less risky investment vehicle, such as cash reserves, and some portion of the investment portfolio purchased on margin. As market updates are received, the beta or risk/reward characteristic of the investor's investment portfolio is recalculated (step 21). The newly calculated beta is then compared against the desired beta (step 22). If the difference between the newly calculated beta and the desired beta lies outside a predetermined threshold, the process continues to step 23, else the process ends or returns to monitoring the beta of the investment portfolio. If the newly calculated beta is above the desired beta, then the process continues to step 24. If the newly calculated beta is below the desired beta, then the process continues to step 25.

In step 24, there are multiple options. First, if there is any of the investment portfolio that has been purchased on margin, then this margin amount can be decreased to reduce the beta. Depending upon how much the margin amount is, this may reduce the beta to the desired amount or not. If completely reducing the margin amount to zero does not sufficiently reduce the beta to the desired amount, then additional steps need to be taken. Reducing the margin amount requires an infusion of funds to pay off the margin loan. If reducing the margin amount to zero is not possible (or the investor desires to modify the beta without investing additional funds, then the beta can be reduced by transferring funds from the predetermined portfolio to the less risky investment vehicle. This may result in a taxable event. A third alternative is possible. The investor may purchase a certain amount of the less risky investment vehicle to reduce the beta to the desired amount. This third option also requires an infusion of funds.

In step 25, there are also multiple options to increase the beta to the desired amount. First, some funds can be transferred from the less risky investment vehicle to the predetermined investment portfolio. This may result in a taxable event, depending upon the type of less risky investment vehicle. A second option to increase the beta to the desired amount is to increase the margin amount. This does not require any funds, and therefore may be a preferable option in some cases. A third option to increase the beta to the desired amount is to purchase an additional amount of the predetermined portfolio, assuming that there is some portion of the total investment in the less risky investment vehicle.

Once the necessary calculations are performed, and the options presented to the investor or the investment manager, the system either: (1) transfers funds between the predetermined investment portfolio and the less risky investment vehicle; or (2) modifies the margin amount (either by paying off some of the margin loan or purchasing an additional amount of the predetermined investment portfolio on margin); or purchases the necessary amount of the predetermined investment portfolio or the less risky investment vehicle. The process then either ends or returns and recalculates the actual beta based on the latest market conditions or market data.

Examples of predetermined investment portfolios can include almost any investment portfolio. Some examples include the Dow Jones Industrials, the S & P 500, the Russell 2000 or other market indices. Market sector investments could also be employed if an investor wanted to be invested in a certain class of securities but wanted a different beta than these classes normally exhibited. Socially acceptable securities could also be used as a base from which any desired beta can be obtained.

Many options exist for the less risky investment vehicle, such as government bonds, money market funds, cash reserves, etc.

A preset bound on the amount that an individual investor can purchase on margin can be employed to prevent excessive margin purchases. This creates an upper bound on the betas that can be obtained by the system.

Alternatively, based on a beta of the particular less risky investment, certain very low betas may not be possible. Thus, the less risky investment's beta establishes a floor below which no lower beta can be obtained.

Figure 3:
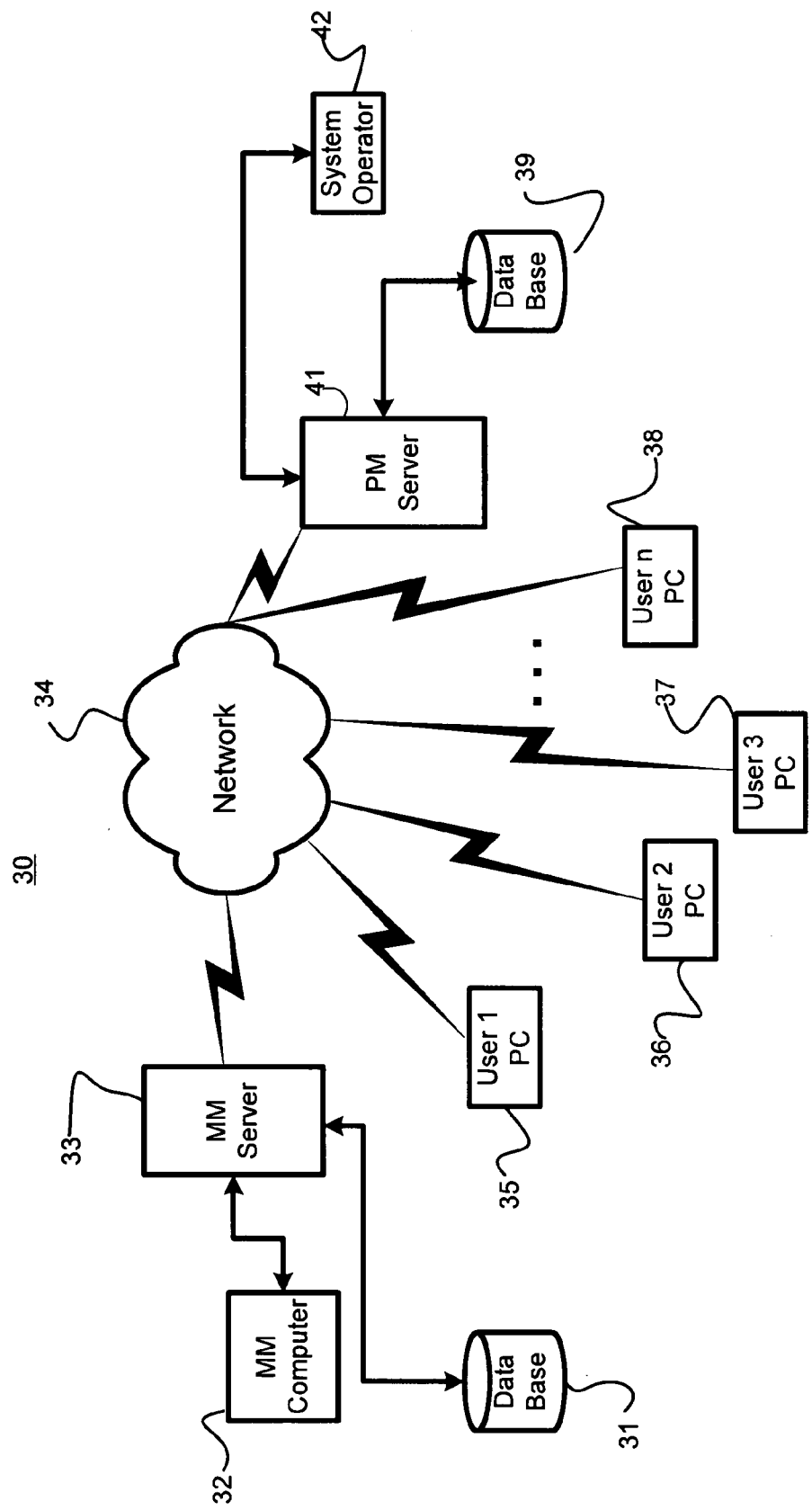
FIG. 3 depicts an exemplary embodiment of an apparatus for enabling a user to manage and trade portfolios of assets, rights and/or liabilities using margin according to one aspect of the present invention.

FIG. 3 shows an exemplary embodiment of a system 30 for implementing the above exemplary methods for modifying a risk/reward characteristic of a predetermined portfolio. A money manager (or an investor) provides input to the computer-based portfolio management system. This input includes portfolio trading orders, risk/reward characteristic preferences, fund transfers, etc. System 30 includes a computer 32 used by the manager to input the manager's information and preferences to the portfolio management system operating on portfolio manager server 41. The manager's preferences are stored in the system database 39 and also by the manager in his database 31. A system operator 42 controls the access and performance of the portfolio manager 41. System 30 includes a communications link via the Internet 34, for example, over which a manager can provide preference information. The communication path to the Internet can include a server 33 and/or an Internet connection via for example, a telephone modem, a cable modem, a cellular modem, and/or a satellite link, etc. Other users 35-38 can also access the portfolio manager 41 and provide portfolio orders, fund transfers and trading preference information. The portfolio management system 41 calculates the margin amount, approves all trades and interacts with a market data system to receive market data, which is used inter alia to update the risk/reward characteristic of the individual accounts, as well as those of the predetermined portfolio and the less risky investment vehicle.

User Interface Explained Via Examples

Leverage Slider—Scenario 1

FIG. 4 shows a flow chart 40 of the screens used to interact with the customer to complete the customer's order. Beginning with the "My Accounts" screen 43, the customer selects the choose/build folio link 44, selects "YES" for leverage 45, which opens the leverage slider screen 48. If the user had selected "NO" to leverage, the steps 56-58 (shown in dashes) would have been performed. Inputs to this screen from the system include the beta volatility 46 for the selected folio and the customer's buying power 47. Inputting an equity percentage 49 enables the system to calculate the maximum amount possible 51 for the given transaction. The user is then prompted to enter the amount of the transaction (or to change the equity/leverage ratio) 52. If the customer decides to change the equity/leverage ratio this takes the user to the leverage slider 48. If not, then the preview order screen is shown 53. Moving past this screen submits the buying power changes to the system (i.e., reduces the buying power if the customer has used leverage) 54 and provides the confirmation order screen 55.

In this example, a customer selects creating a new folio from the "My Account" screen (not shown), which opens the screen 530 shown in FIG. 53.

Figure 8:
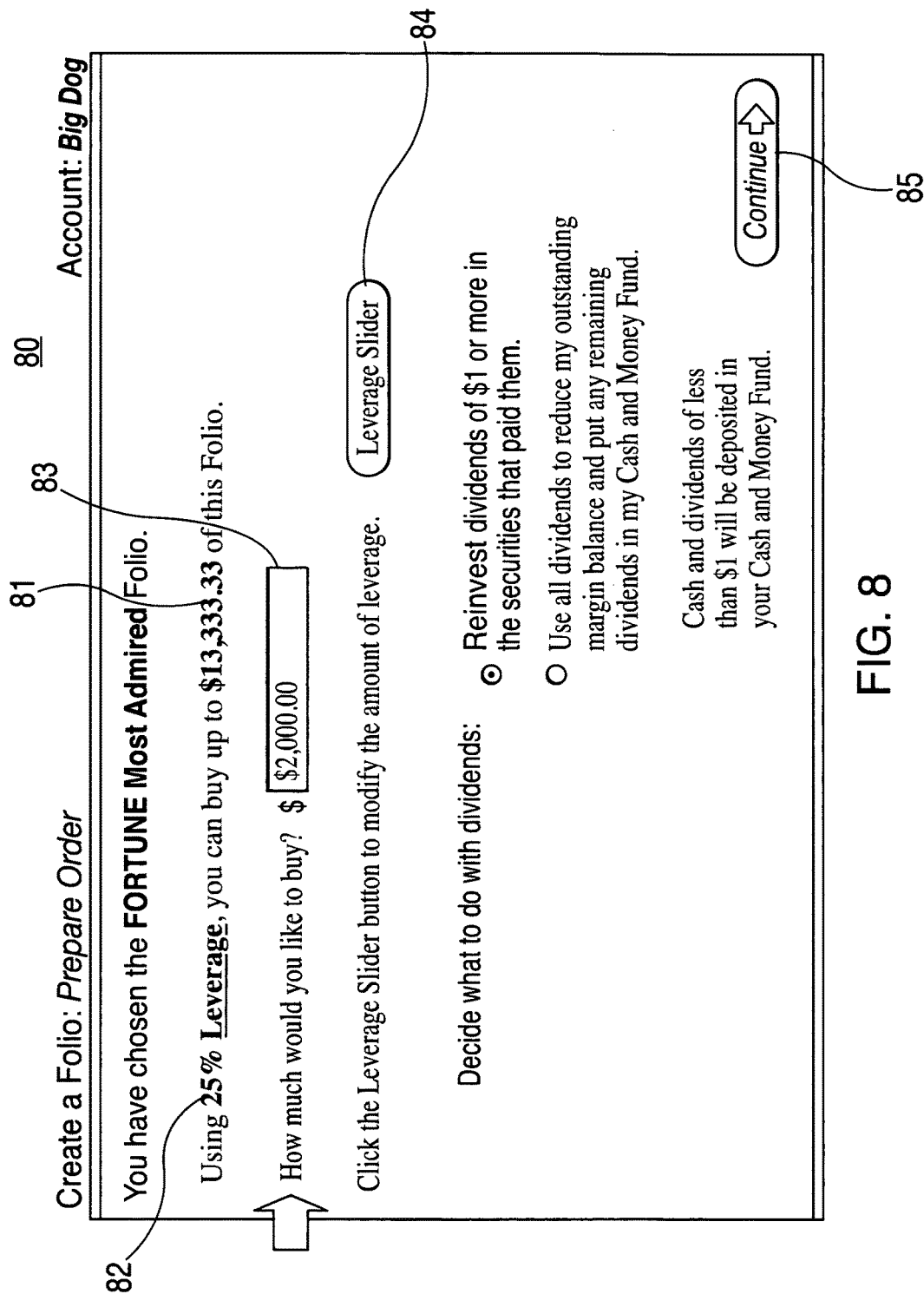
FIGS. 8-10 depict exemplary embodiments of web pages for use in the graphical user interface set forth in FIG. 4.

In this example, the customer selects a ready-to-go (or predetermined) portfolio of assets, rights and/or liabilities from the screen 530 depicted in FIG. 53, which in turn opens the screen 50 in FIG. 5. To "turbo charge" (i.e., increase the possibility of higher returns) his or her returns, the customer selects using Leverage by clicking on the Leverage Slider button 51 on the prepare order screen 50 shown in FIG. 5. This opens the screen 60 shown in FIG. 6. This screen 60 includes a bar chart 65, and a graph 62 along with sliders 61 (to change the equity/leverage ratio) and 63 (to change the time view of the graph in 62). Clicking on the prepare order button 64 takes the user to the screen in FIG. 8.

Figure 6:
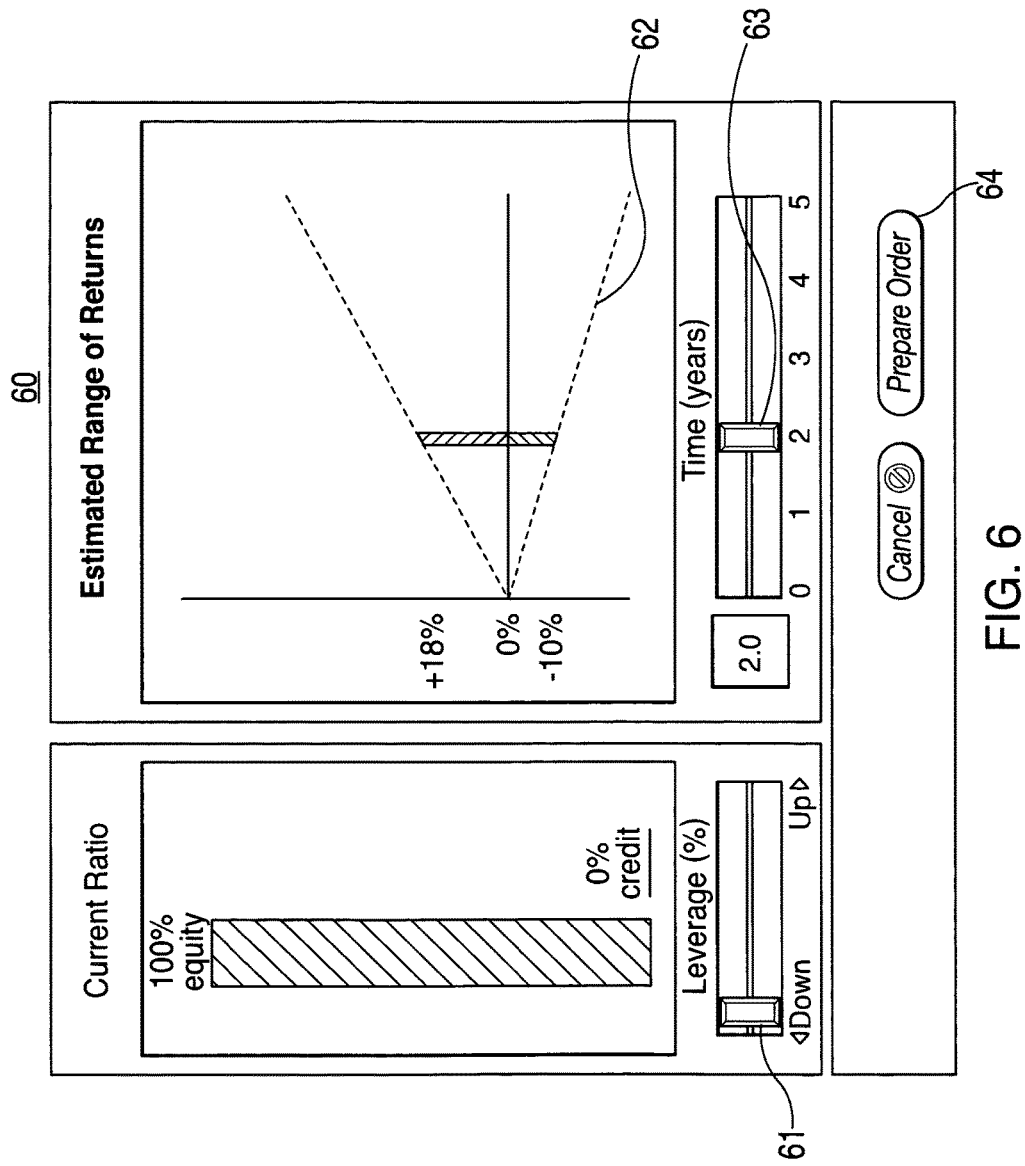
FIGS. 6 and 7 depict an exemplary embodiment of a graphical user interface for enabling a user to quickly and easily set the amount of margin to be used in trading portfolios of assets, rights and/or liabilities according to still another aspect of the present invention.
Figure 7:
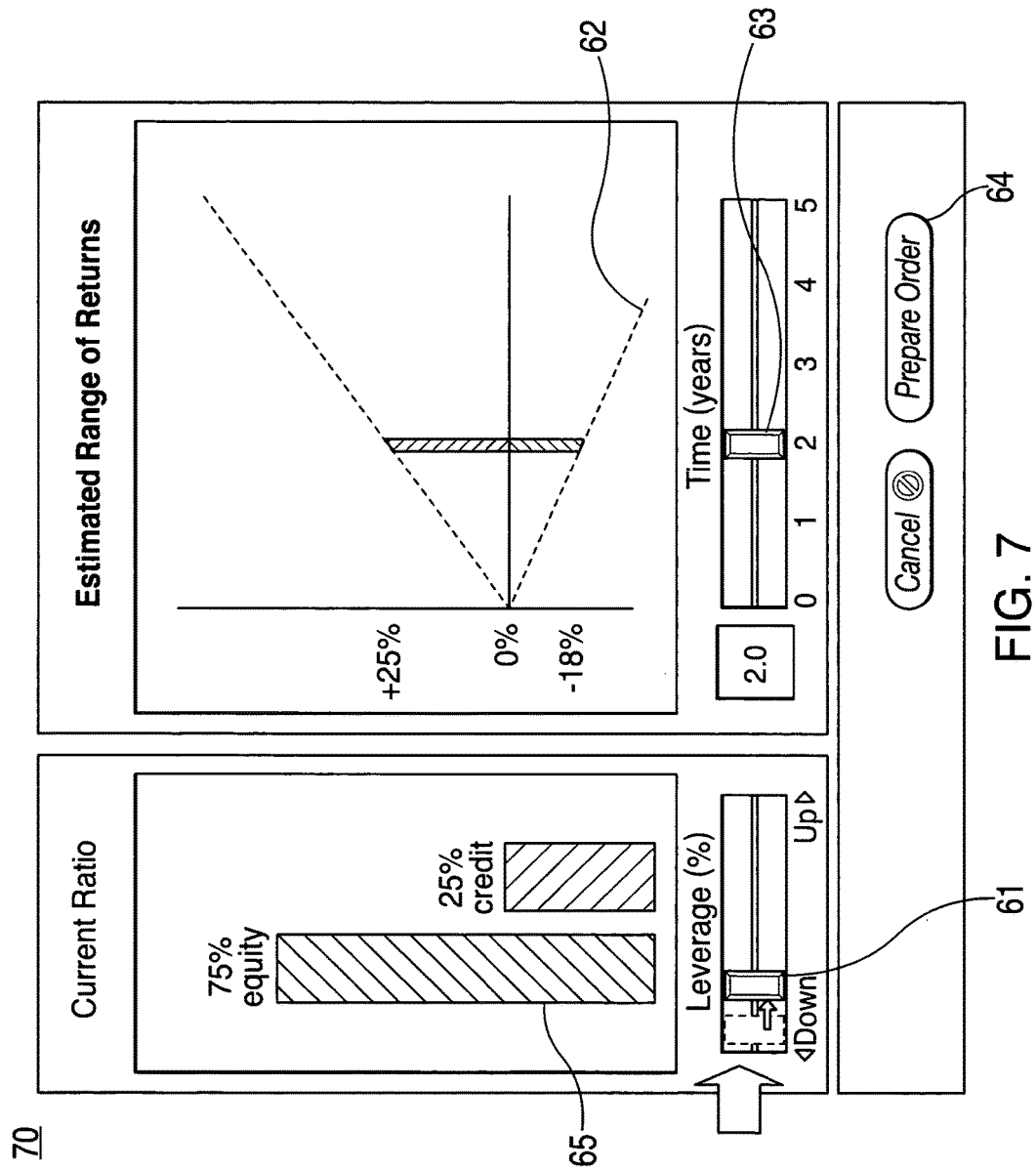

In this example, the customer selects 25% leverage and 75% equity. FIGS. 6 and 7 show exemplary user screens (60, 70, respectively) presented to the user in the above process to help the user understand the effects of leverage. A slider bar 61 allows the user to increase the amount of leverage on the user's order by simply moving the bar up and down the scale. A bar chart 65 showing the respective ratios of equity and leverage is displayed to the user. A plot 62 of the estimated range of returns shows the user the effect on the estimated range of returns due to the leverage. The user can adjust the slider bar 63 on the time scale to view the effect of the estimated range of returns for a given year from the present.

FIG. 7 shows the effect the increase in leverage has on the ratio plot and the estimated range of returns, which was brought about by moving the slider bar 61 from its position in FIG. 6 to its position in FIG. 7. Note the change in the bar chart 65 and the change in the plot 62. Upon clicking on the prepare order button 64, the user is presented a prepare order screen 80 shown in FIG. 8, in which the user can enter the amount of the desired transaction.

Figure 9:
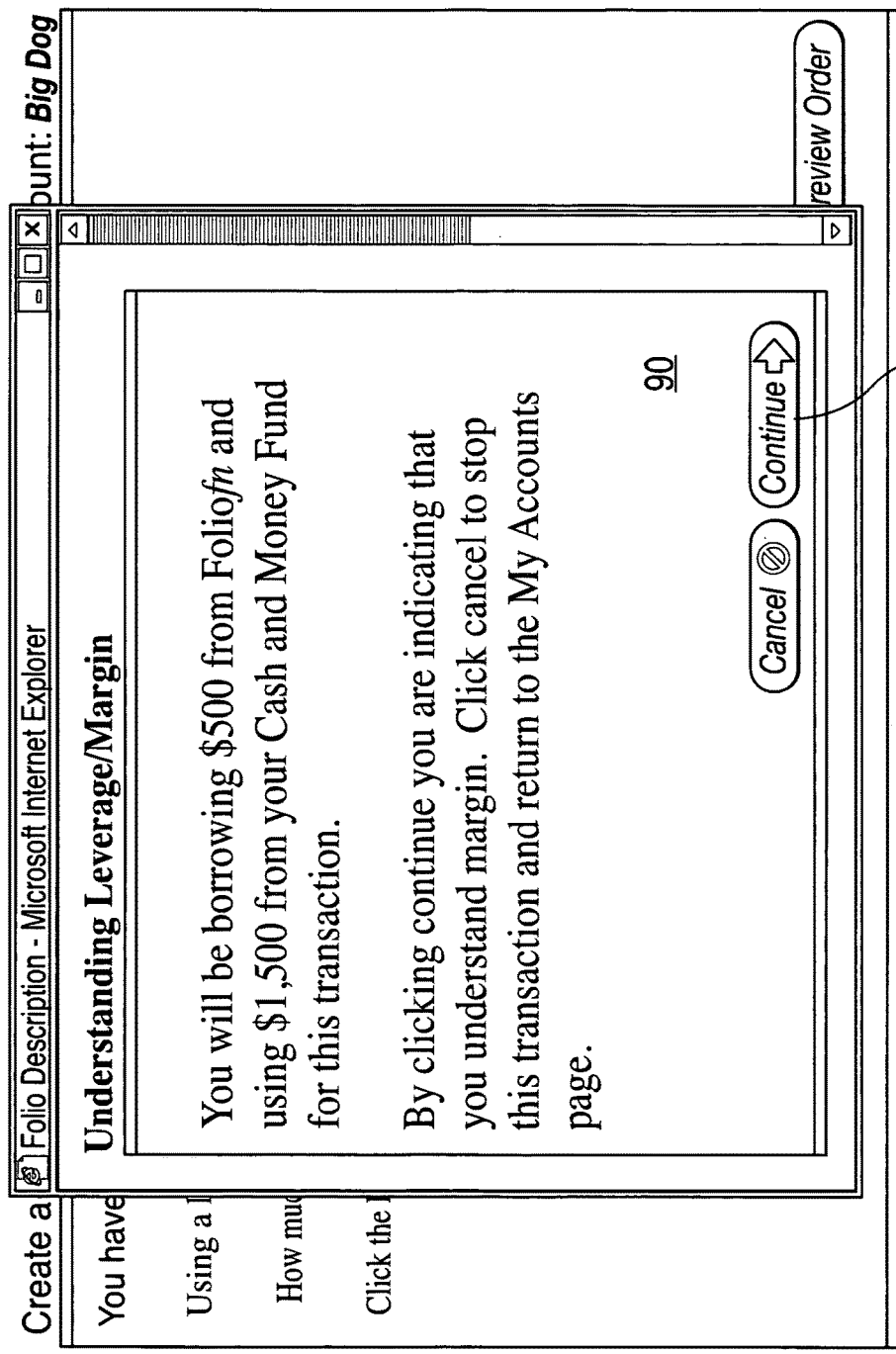
Figure 10:
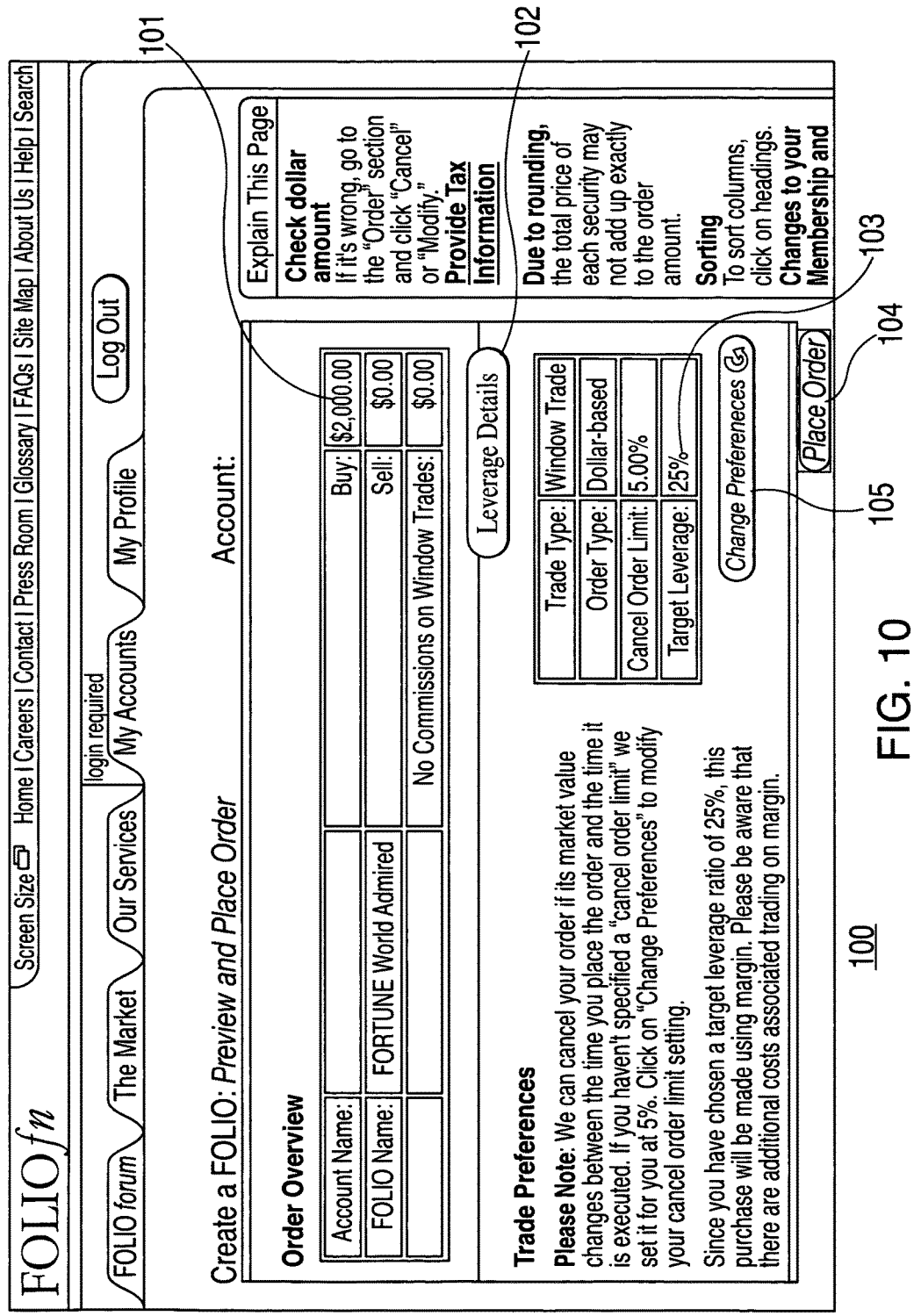

Screen 80 displays the maximum amount 81 the user can purchase based on the previously indicated amount of leverage 82 entered in screen 70. The user is presented a field 83 in which the user can enter the amount of the trade. Clicking on the leverage slider button 84 returns the user to the screen 70 in FIG. 7. Upon clicking on the continue button 85 the user is provided a verbal description (e.g., "Understanding Margin" screen 90 shown in FIG. 9) of the proposed transaction to ensure the customer understands his or her order using the previously entered leverage ratio, and the previously entered amount of the purchase. Upon clicking on a continue button 91 on the verbal description screen 90, a preview order screen 100 (FIG. 10) is presented showing the user the details of the order he or she just entered.

Screen 100 includes inter alia the amount of the trade 101, and the target leverage 103. Clicking on the place order button 104 submits the order to the system for execution in accordance with the parameters indicated in the preview screen 100. Clicking on the leverage details button 102 displays the leverage details screen 90. Clicking on the change preferences button 105 enables the user to modify the trade preferences, which include the trade type (e.g., window trade), order type (e.g., dollar based), cancel order limit (e.g., 5%), and the target leverage (set here in this example as 25%).

Ready-to-go Pre-Leverage Slider—Scenario 2

Figure 11:
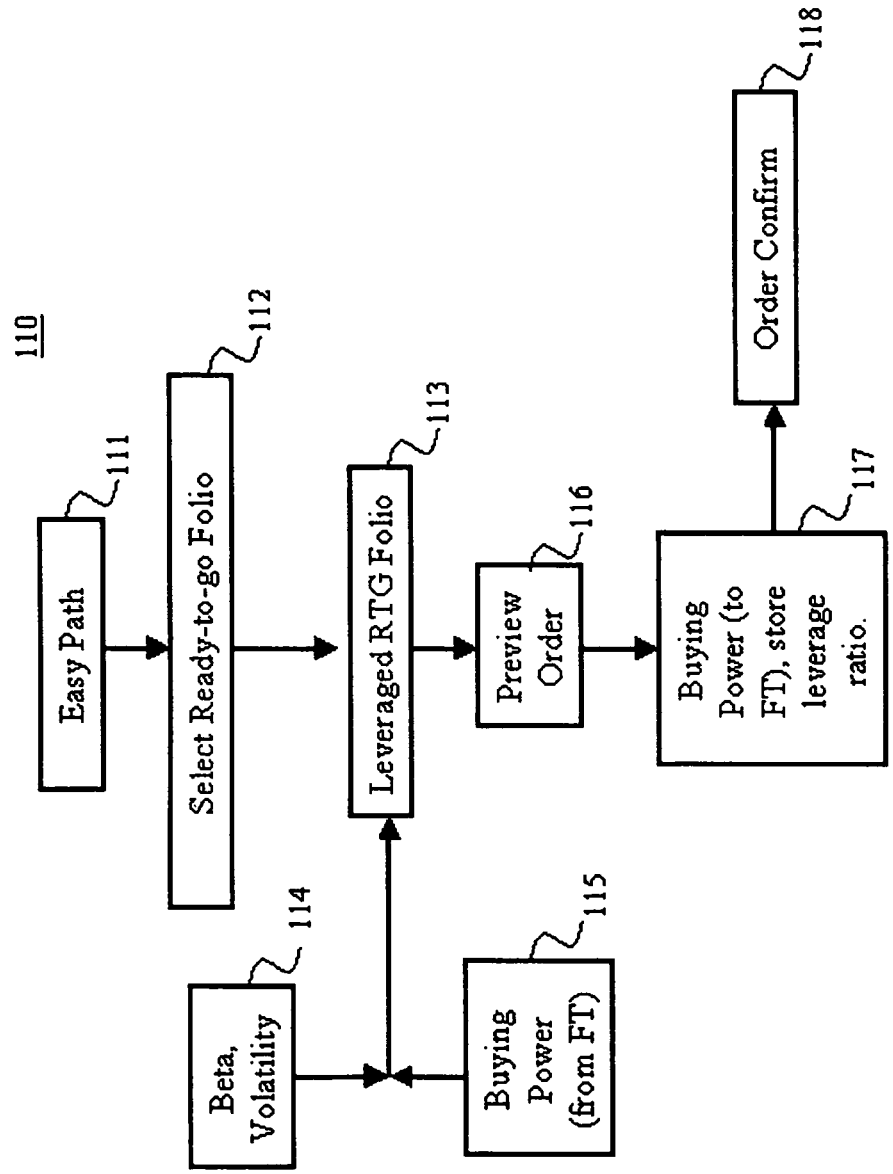
FIG. 11 depicts an exemplary embodiment of a flow chart of web pages for interacting with a user to purchase a pre-existing portfolio of assets, rights and/or liabilities with pre-existing leverage as part of a graphical user interface for use in the apparatus of FIG. 3 according to another aspect of the present invention.

In this example, a customer has selected the "easy path" route 111 to creating a portfolio of assets, rights or liabilities. This option enables a user to select a ready-to-go folio, one of which includes ready-to-go pre-leveraged portfolios of assets, rights and/or liabilities. In this example, the user selects one of the ready-to-go pre-leveraged folios. The process 110 is depicted in FIG. 11. Upon selecting the easy path 111, the user is permitted to select one of the ready-to-go folios 112, which includes a leveraged ready-to-go folio 113, which receives inputs from the system including beta volatility 114 and buying power 115, based on the user's credit worthiness. Once the ready-to-go leveraged folio is selected, the user previews the order 116, the buying power is transmitted to the system for updating the customer's profile/account 117, and the order is confirmed 118.

Upon selecting the easy path route 111, the user is then able to select one of the ready-to-go folios 112. Ready-to-go pre-leveraged folios are presented to the user 113 based on previously entered beta volatility 114 and the user's buying power 115 (determined by the system based on, e.g., the user's credit worthiness). In this example, the pre-leveraged folio is 25% leveraged. Once selected, the user is presented with the preview and place order screen (step 116) which includes the details of the order for review prior to submission to the system for execution. As part of the preview process, the order and leverage is sent to the system and stored 117, and then the when confirmed 118 the order is sent for execution.

Figure 12:
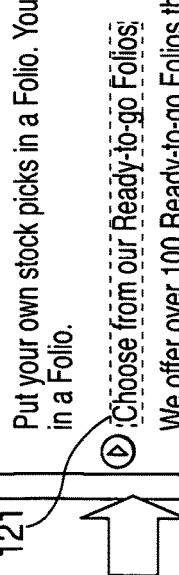
Figure 13:

FIG. 12 shows the easy start screen 120 that enables the investor to trade upon executing three relatively simple steps: (1) Choosing a way to invest; (2) Selecting or creating a folio; and (3) Saving a folio, test driving a folio or opening an account. In this case, the user decides to choose a ready-to-go folio by clicking on the Choose From our Ready-to-Go Folios link 121, which opens the Step 2 screen 130 shown in FIG. 13. In this example, the user wishes to select one of the ready-to-go leveraged folios, which he or she does by clicking on the link 131. Upon selecting a pre-leveraged folio, the user enters the amount of the trade in the normal manner and ultimately is presented with the preview order screen 140, which includes all of the details of the order. Clicking on the submit order button (not shown) submits the order to the system for execution in accordance with the parameters shown in the preview order screen 140.

Easy Trade Buy—Scenario 3

In this example, the customer places an "easy trade," in which the customer simply desires to purchase $2000 of an existing portfolio of assets, rights and/or liabilities. In this example, the user had previously user leverage but now prefers not to use any leverage for this trade. The process flow 150 of this example is shown in FIG. 15, which includes starting with my accounts 151, selecting easy trade 152a, selecting buy cash only 153a, the slider warning 154, skipping the slider screen 155b, choosing all cash or last leverage ratio 164 and the order confirmation 163b. The dashed blocks 152b, 153b, 153c, 155a, 156, 157a, 157b, 158a, 158b, 159, 162, 163a represent unselected screens/options.

Figure 16:
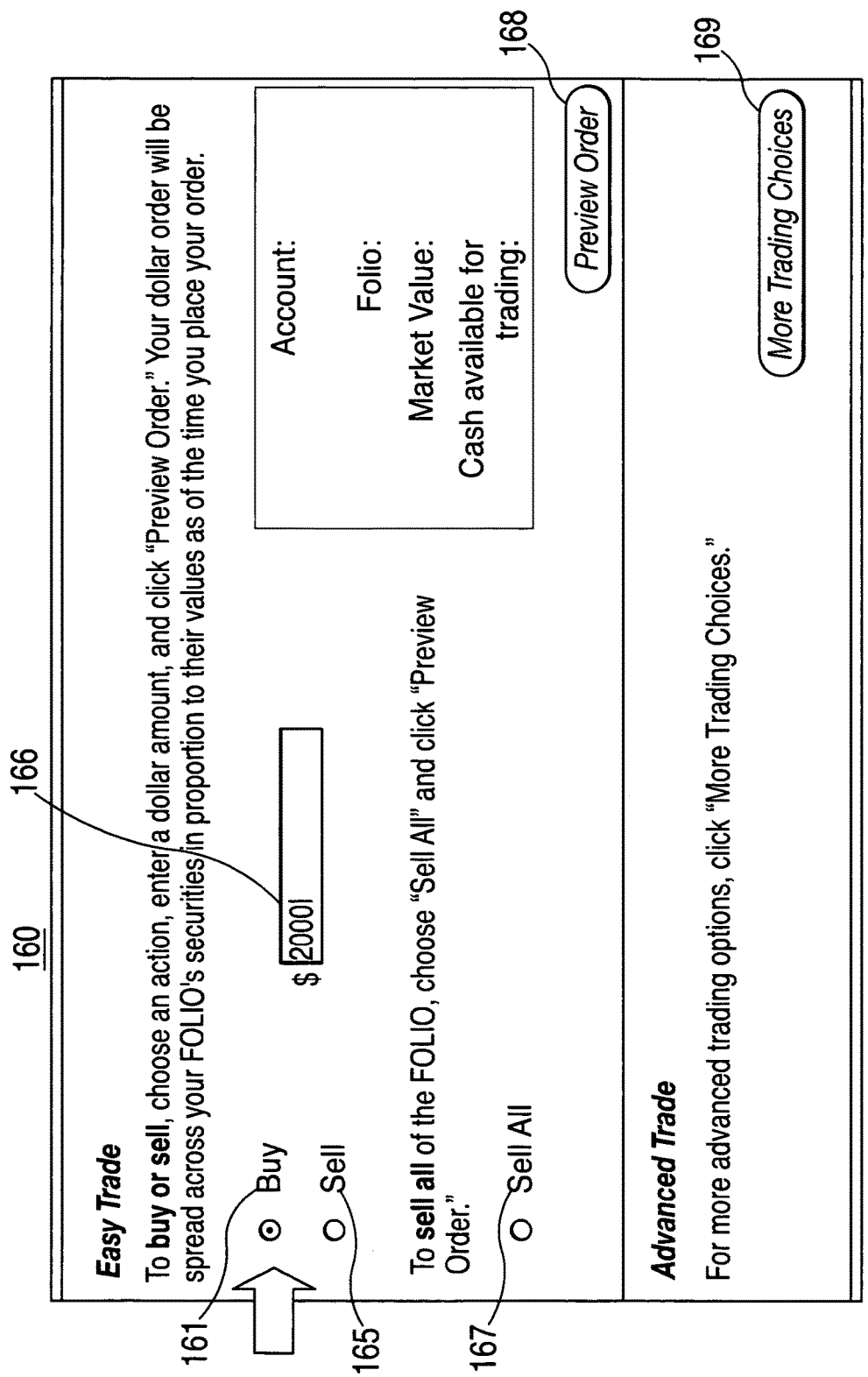

The easy trade screen 160 (FIG. 16) is shown to the user, which enables the user to enter the amount of the present transaction in field 166, and indicate whether the transaction is a buy 161, a sell 165 or a sell all 167. For more trading choices, the customer can select the "More Trading Choices" button 169.

Figure 17:
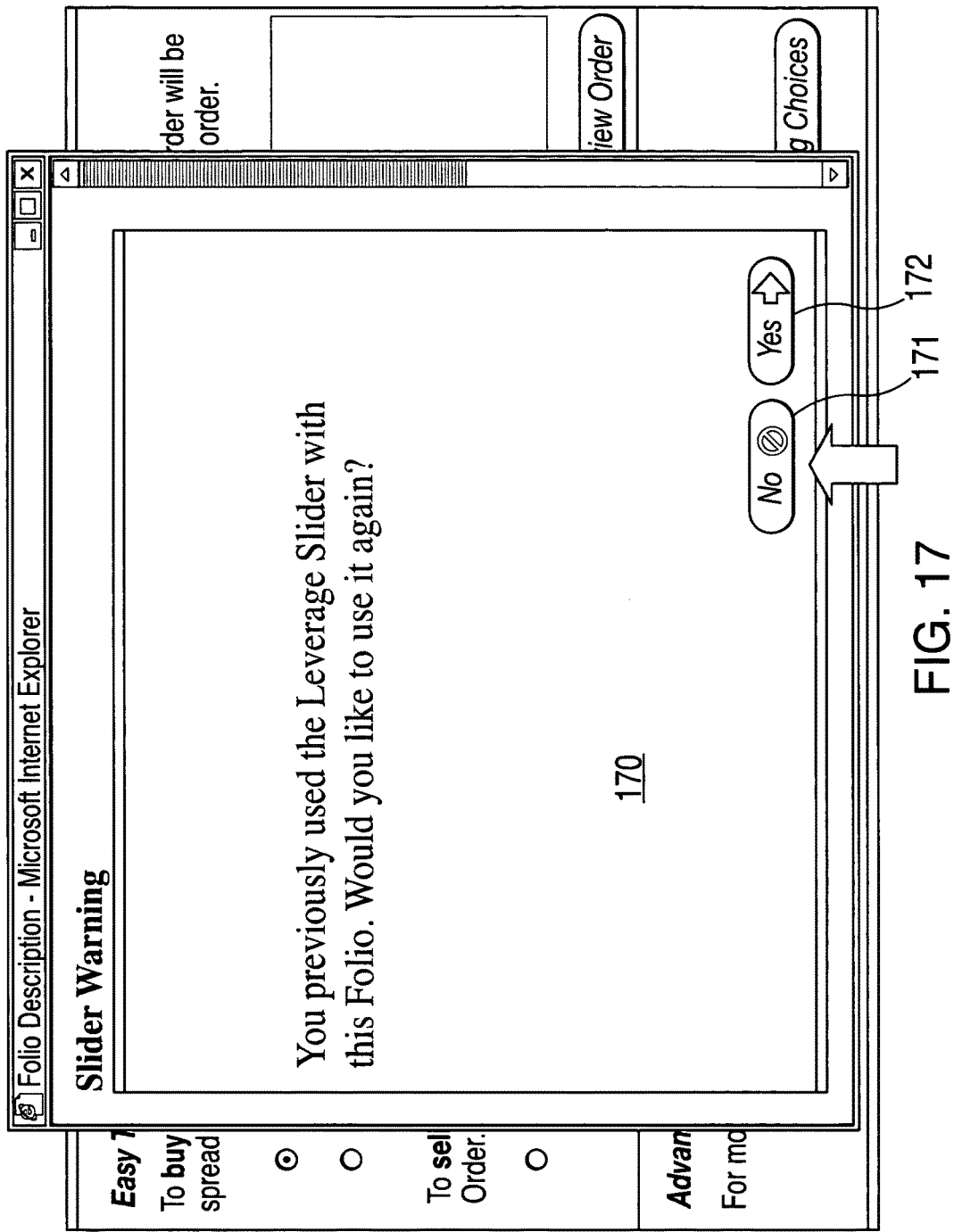

Upon clicking on the preview order button 168, the user is presented with the slider warning screen 170 (FIG. 17), which reminds the user that the user previously used leverage with this folio, and enables the user to select leverage 171 (YES) or not 172 (NO).

Figure 18:
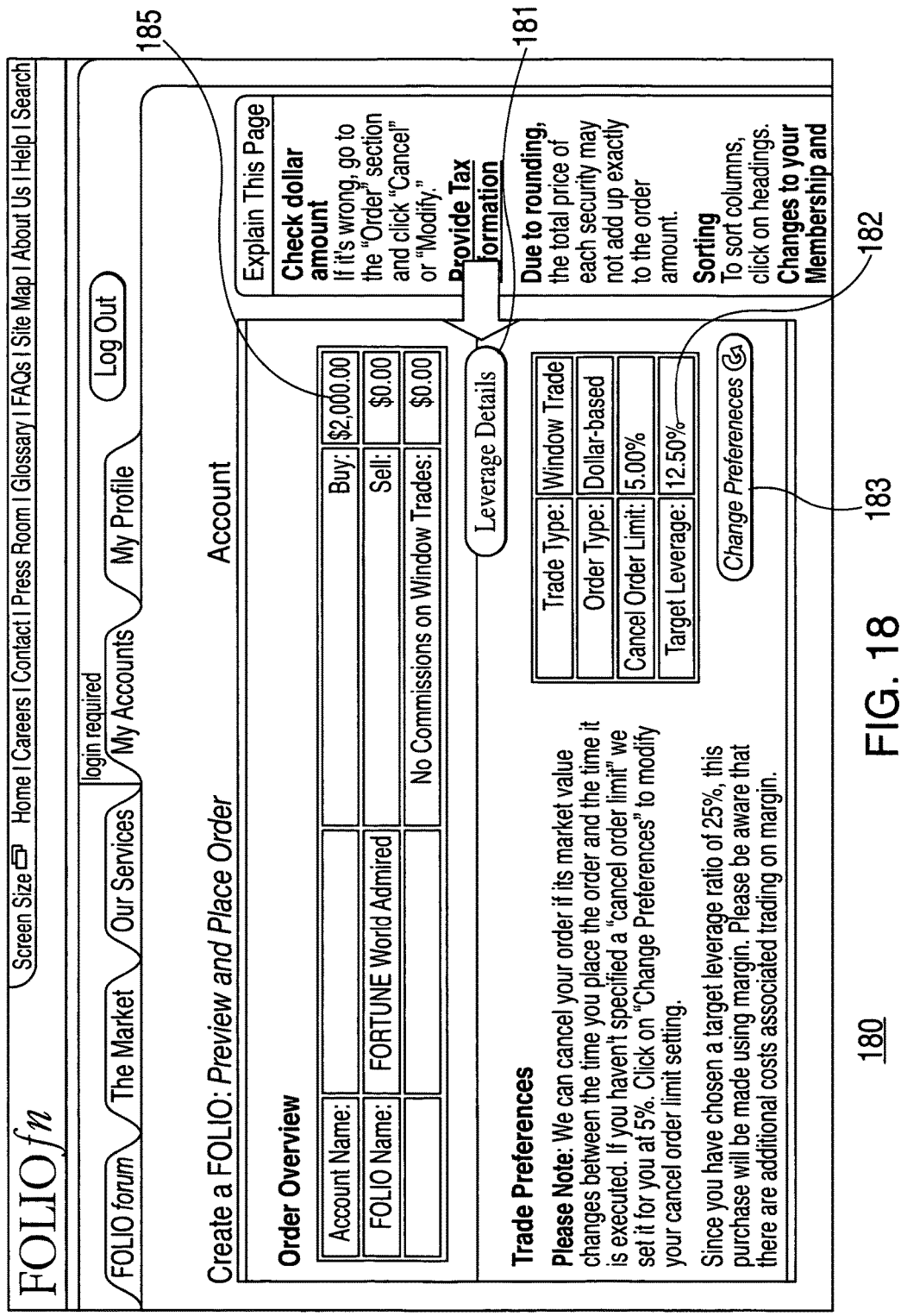

Upon clicking on the "NO" button 172, the user is presented with the preview order screen 180 (FIG. 18), which shows the details of the present order, including the amount of the purchase 185, and the target leverage 182. In this case, the target leverage 182 is shown as 12.5%, which will be the result of all prior orders after submission of the present order. Clicking on the leverage details button 181 opens the screen 190 shown in FIG. 19, which includes all of the details of the present order, such as the buy amount 191, the equity (cash) amount 192, the target margin 193, the total equity 194, the current margin 195, the target percent margin 196 and the net change in cash fund 197.

Easy Trade Sell—Scenario 4

Figure 20:
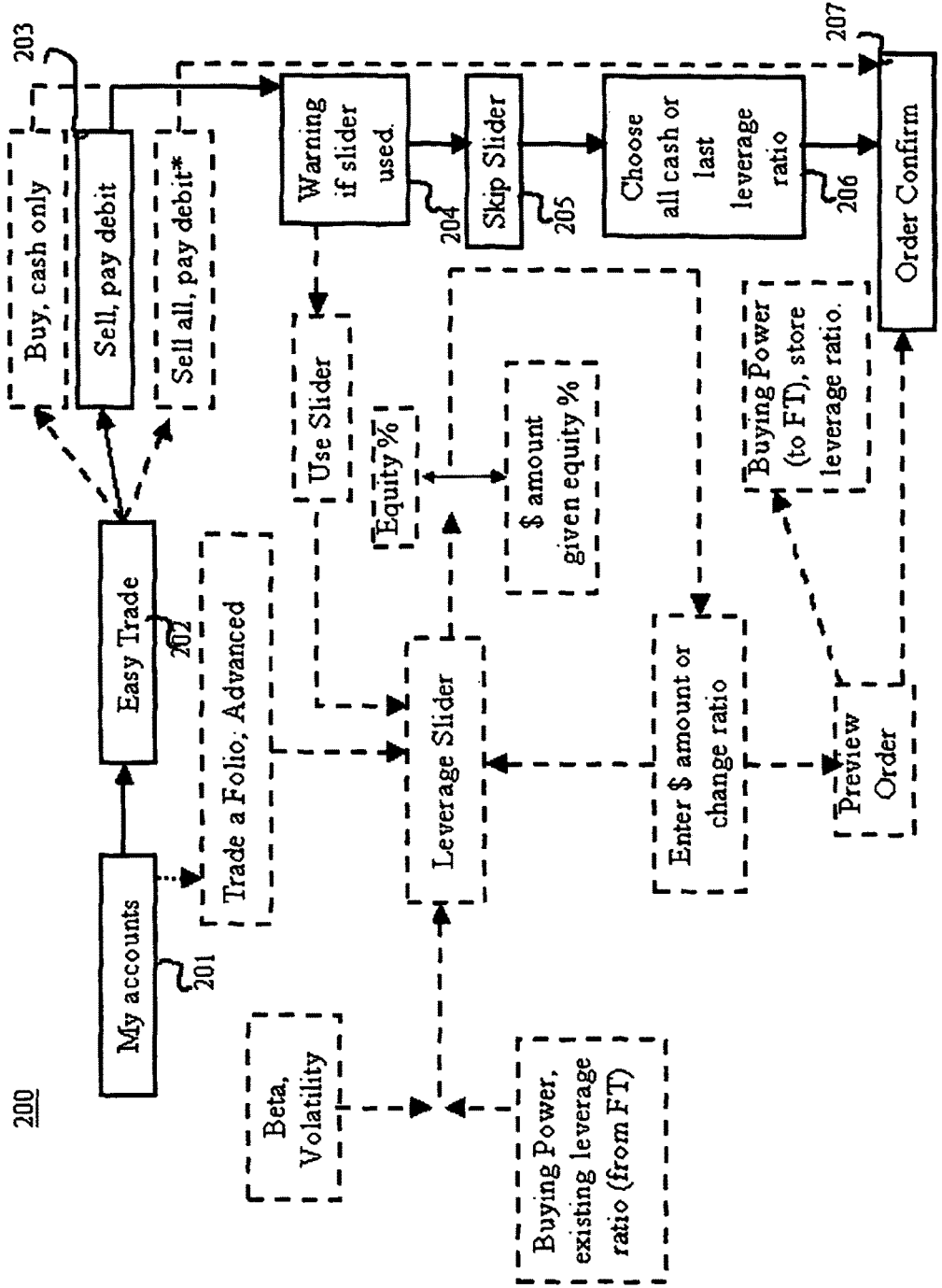
FIG. 20 depicts an exemplary embodiment of a flow chart of web pages for interacting with a user to sell a pre-existing portfolio of assets, rights and/or liabilities which may have been purchased using leverage as part of a graphical user interface for use in the apparatus of FIG. 3 according to another aspect of the present invention.
Figure 21:
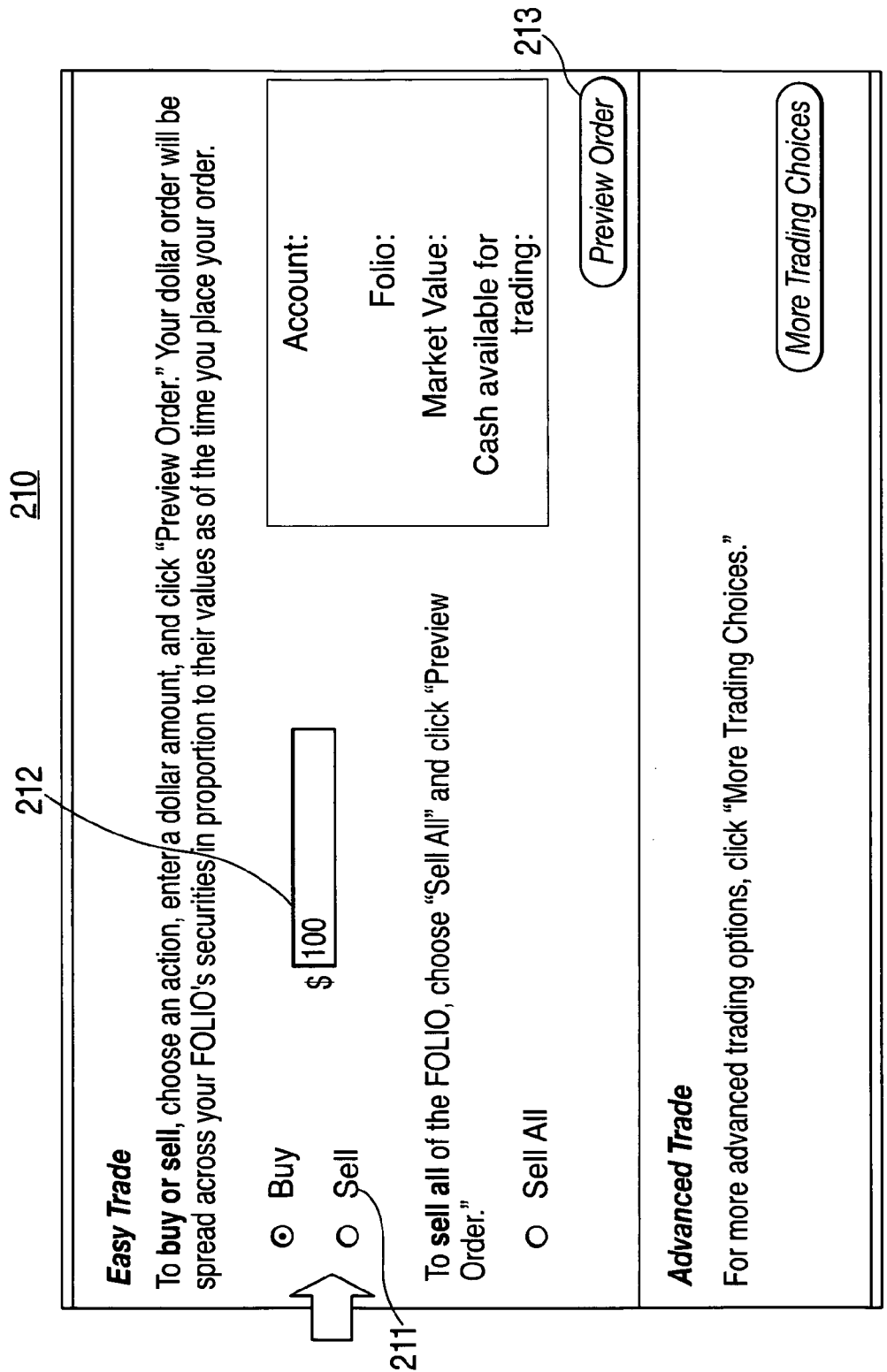

In this example, the customer desires to place an easy trade, which in this instance is a sell order of $100 of a previously purchased portfolio of assets, rights and/or liabilities that was purchased on margin. In this trade, the customer desires not to user the slider. The customer then is presented with the option of paying the leverage/margin down or to put the proceeds into cash. FIG. 20 shows the process 200 details of this trade, which starts with the my accounts 201, selection of the easy trade 202, selection of sell, pay debit 203, warning slider 204, skip slider 205, selection of all cash or last leverage ratio 206 and order confirmation 207.

Figure 22:
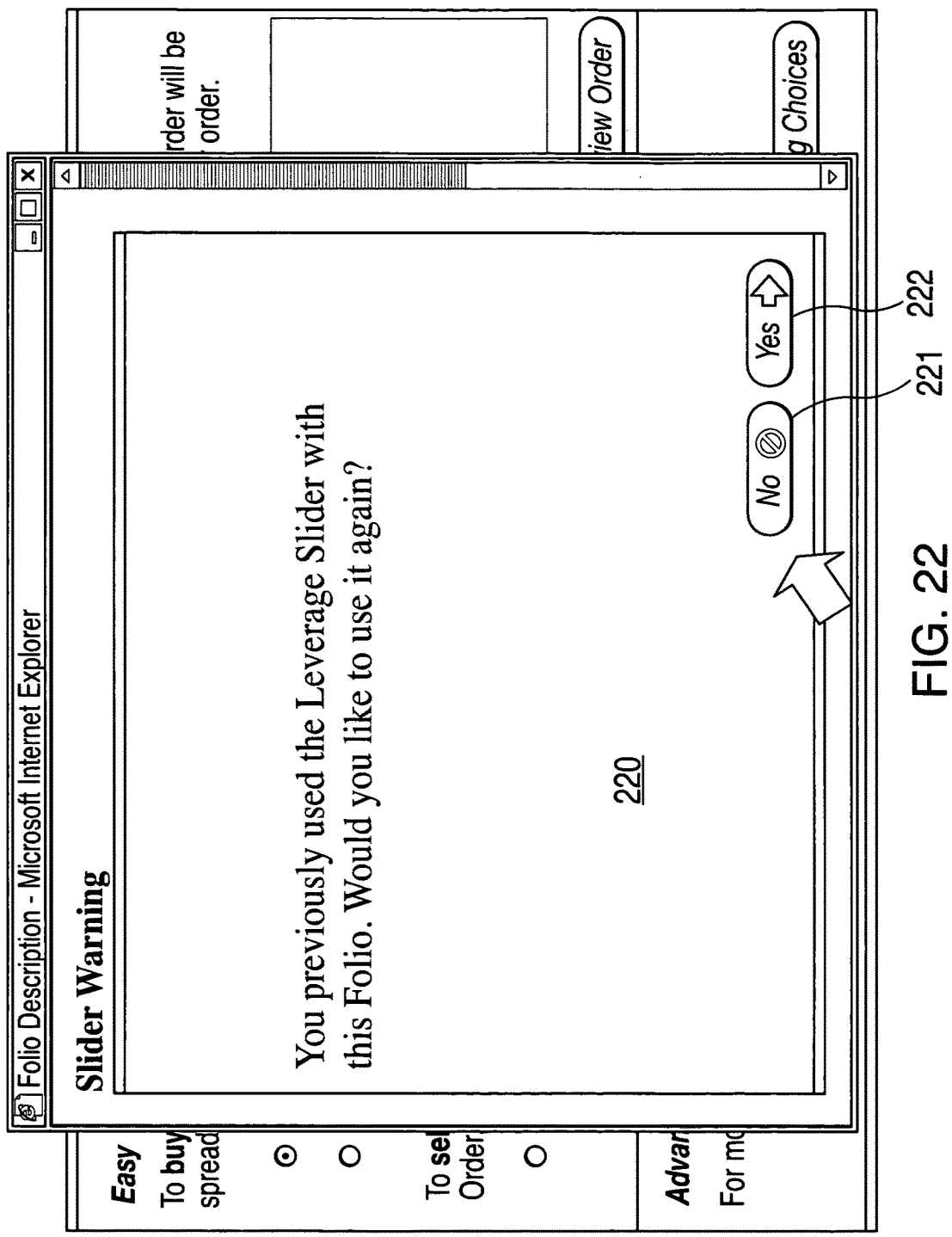
Figure 23:
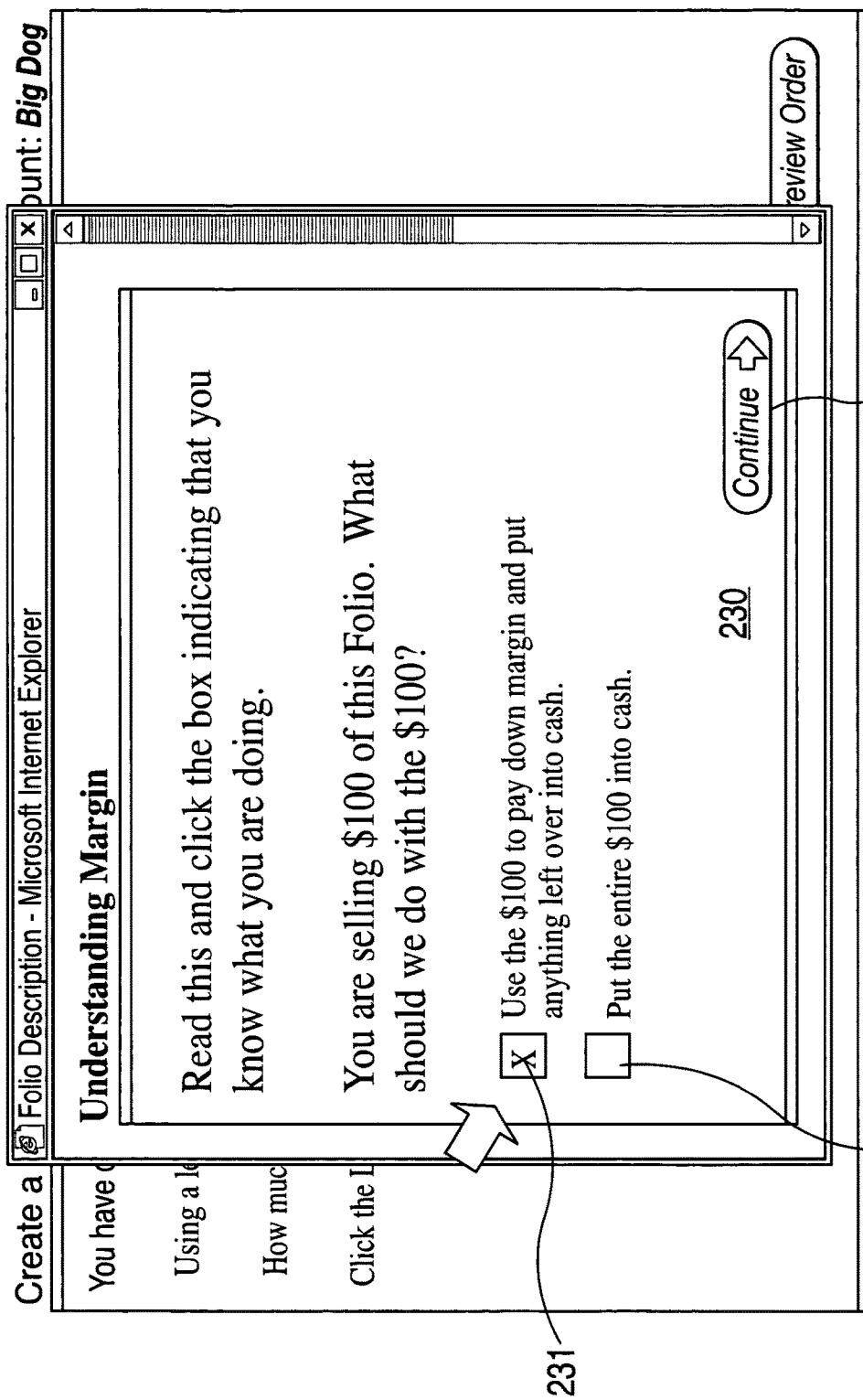
Figure 24:
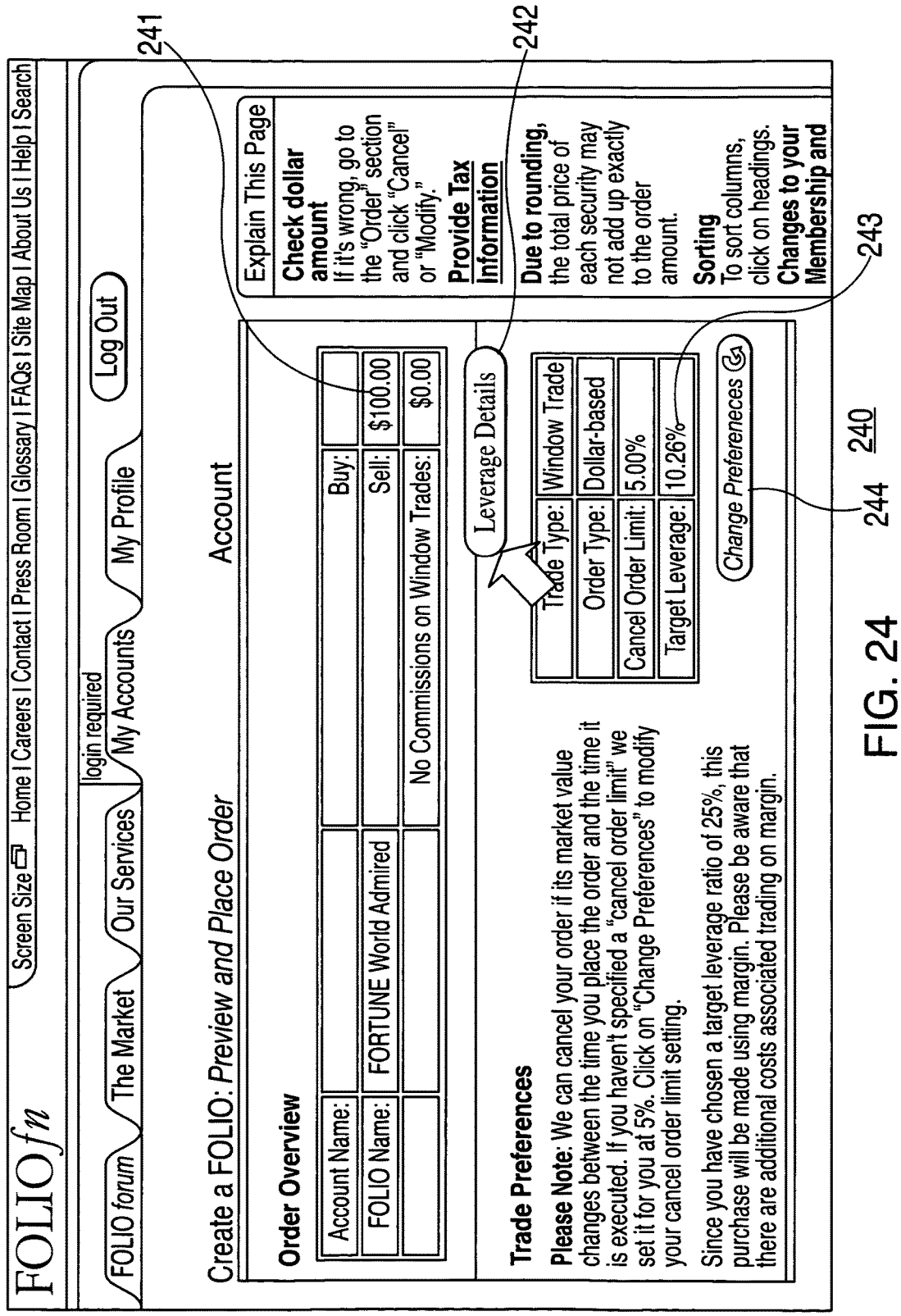

After inputting $100 in the amount field 211 on the easy trade screen 210, selecting the sell choice 212 and clicking on the preview order button 213 of the easy trade screen 210 (FIG. 210), the user is presented with the slider warning screen 220 (FIG. 22) that informs the user that the user previously used the Leverage Slider with this portfolio of assets, rights and/or liabilities, and provides the user the opportunity to use the Leverage Slider again by selecting the "YES" button 222. Upon clicking on the "NO" button 221, the user is shown the Understanding Margin screen 230 (FIG. 23), which enables the user to select whether to user the money to pay down the margin or put the proceeds into cash. Upon selecting to use the $100 to pay down the margin 231 (rather than placing the $100 into cash 232) and clicking on the continue button 233, the user is provided with the preview order screen 240 (FIG. 24), which shows inter alia the sell amount 241 and the target leverage 243. Selecting the change preferences button 244 enables the user to modify the trade type, the order type, cancel order limit or the target leverage 243.

Clicking on the leverage details button 242 opens the screen 250 shown in FIG. 25. In this example, the new margin percent is 10.26% after the proposed trade. This screen 250 shows the sell amount 252, the total sell 253, the sell amount paid to margin 254, the target margin 256, the total equity 255, the current margin 257, and the new percent margin 258.

Advanced Trade—Scenario 5

In this example, the customer selects to make an advanced trade involving a buy order using the Leverage Slider for an existing portfolio of assets, rights and/or liabilities (i.e., the folio). In this case, the customer had previously purchased the folio using 25% leverage and 75% equity. In this trade, the customer desires to change the folio characteristics so that the folio is 50% leverage and 50% equity.

FIG. 26 shows an overview of the process 260 for this trade example. This includes starting from the My Account 261, selecting the advance trade option 262, opening the leverage slider 265, which receives inputs from the system including the beta volatility 263 and the buying power 264, inputting the dollar amount of the trade or changing the leverage ratio, if any, 266, previewing the order 267, forwarding the buying power changes, if any, to the system 268 and confirming the order 269. The dashed blocks are not selected in this process.

Figure 28:
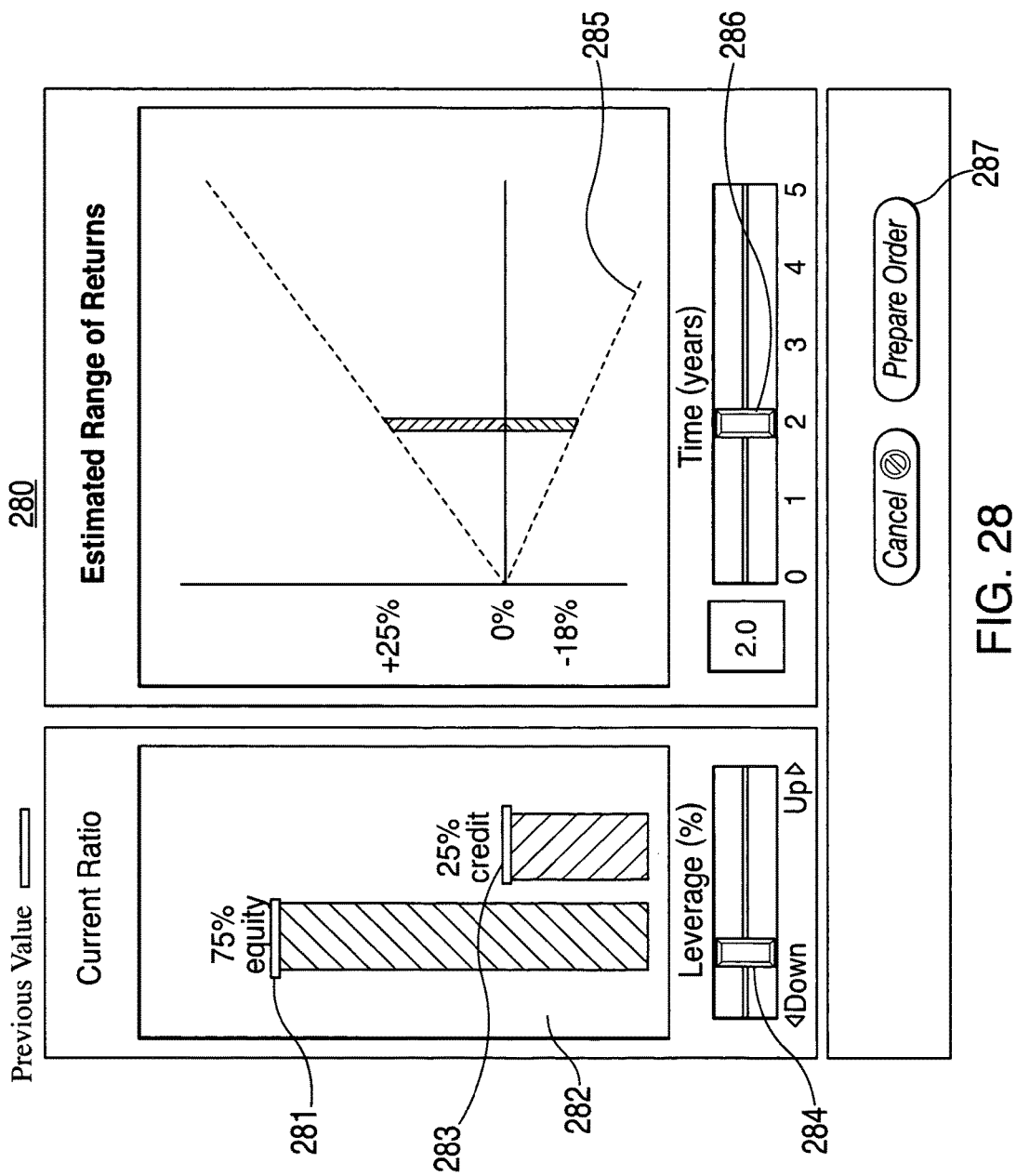
Figure 29:
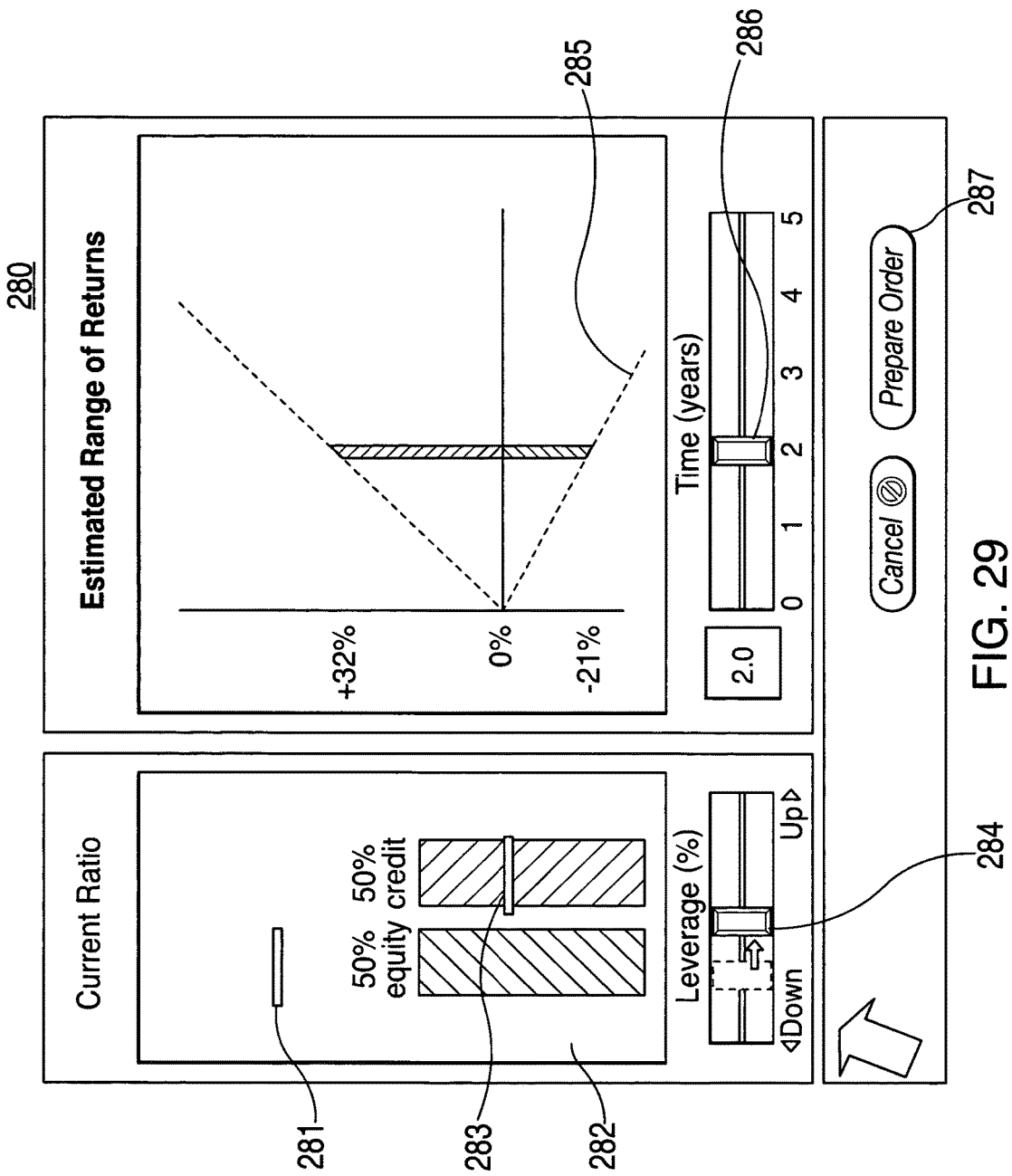

This process 260 enables the customer to modify the expected risk and returns without changing the proportions in the folio. Upon selecting the Leverage Slider button 271 on the advanced trade screen 270 (FIG. 24), the leverage slider screen 280 shown in FIG. 28 is displayed. In this case, the previous values for the equity and credit ratios are shown with indicators 281, 283, respectively, e.g., solid lines. Moving the leverage bar 284 up and down the range changes the respective bars in graph 282, but the indicators 281, 283 remain constant showing the prior leverage/equity ratio, as shown in screen 280 of FIG. 29, which is the same screen from FIG. 28 with the changes due to the movement of the slider bar 284 to the right. Moving the slider bar 286 changes the time view of the graph 285.

Figure 30:
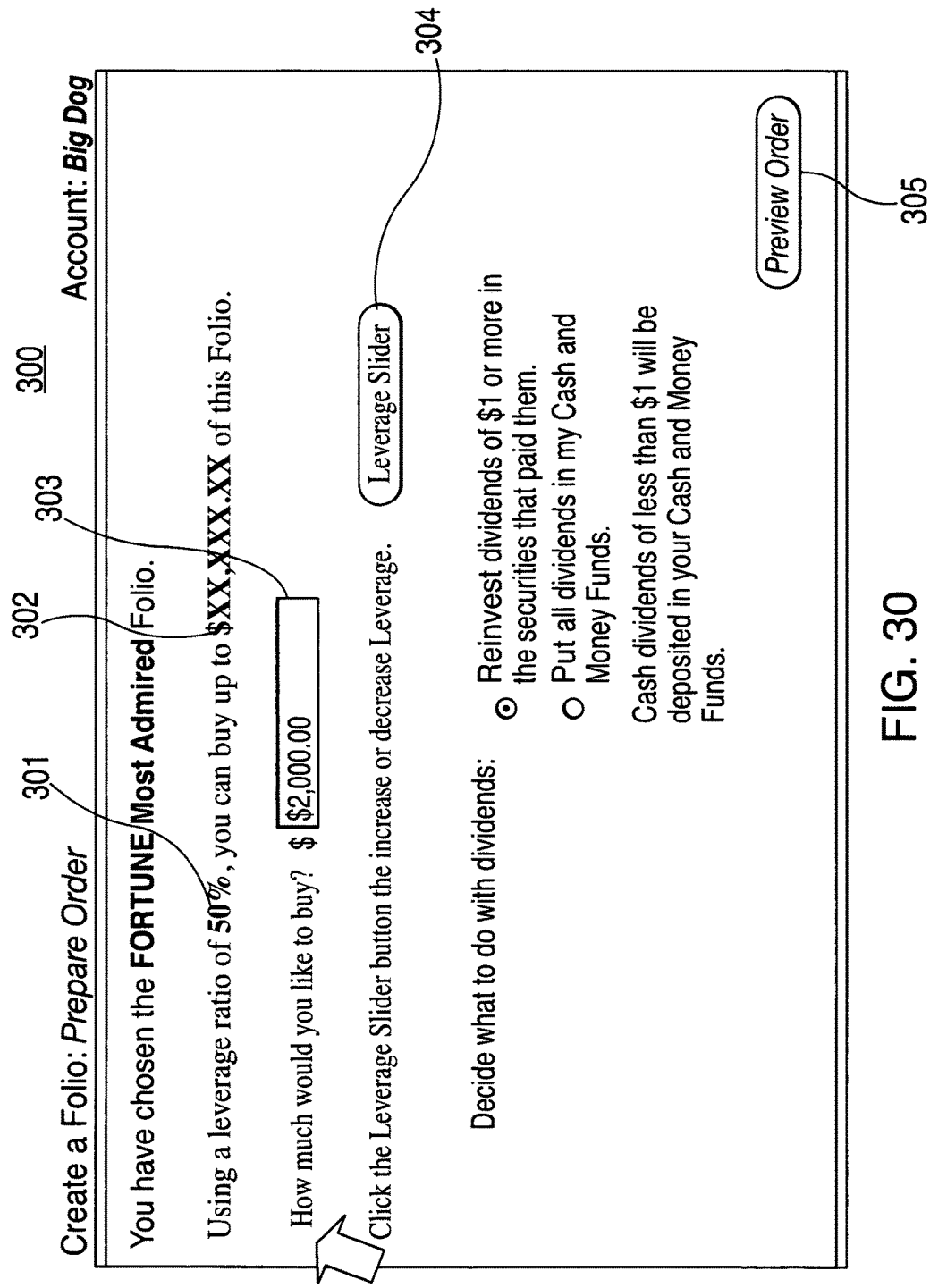
Figure 31:
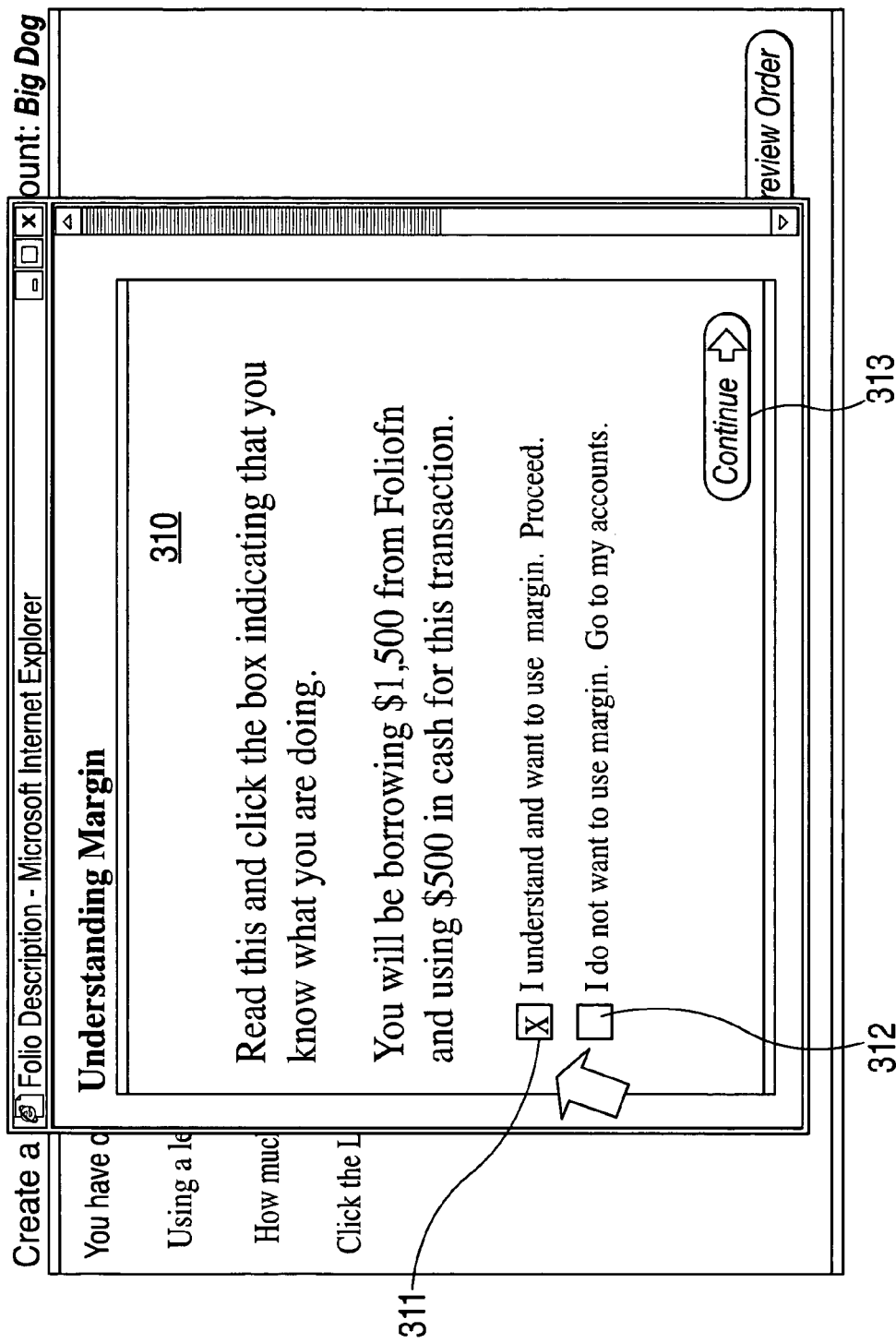
Figure 32:
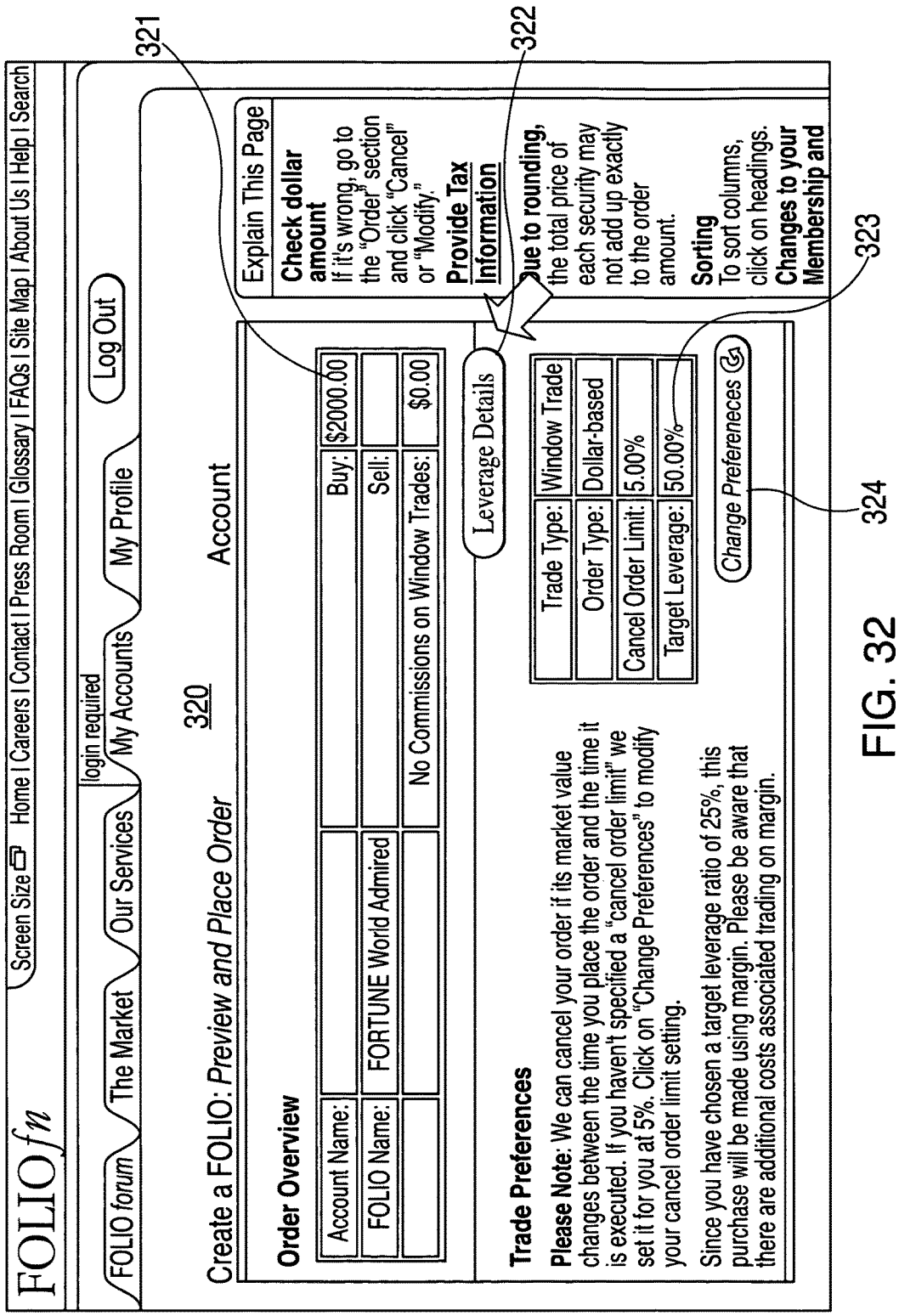

Clicking on the prepare order button 287 opens the screen 300 shown in FIG. 30, which enables the customer to enter the amount of the trade in field 303 based on the previously input leverage ratio 301 and calculated buying power 302. Clicking on the leverage slider opens the leverage slider screen 280 shown in FIG. 29. Clicking on the preview order button 305 opens the Understanding Margin screen 310 (FIG. 31), which describes in words the transaction being proposed by the customer and which enables the customer to indicate that the customer understands he or she is using margin by selecting that he or she understands 311 or not 312. After selecting one of the two options 311, 312 and clicking on the continue button 313, the preview order screen 320 (FIG. 32) is shown indicating the buy amount 321, and the target leverage 323. The user can modify the trade preferences (e.g., trade type, order type, cancel order limit and target leverage) by clicking on the change preferences button 324. Upon clicking on the leverage details button 322 the leverage details screen 330 (FIG. 33) is displayed showing the new margin percentage (which in this example is shown as 50.00%), which displays the buy amount 331, the buy using cash amount 332, the buy using margin amount 333, the total buy amount 334, the target margin 335, and the current margin 336. The remaining part of the process remains as described previously when confirming the order.

User Interface for Opening Margin Account

Turning to FIG. 34, shown therein is the process 340 for opening a margin account. The intermediary step 342 for determining whether the user wishes to add margin to his or her account is added to the normal step 341 for opening a margin account. If the user responds no 344, the process terminates. If the user selects to add margin 343 a special margin email is sent to the user to inform the user of all of the intricacies of margin trading using the system. The process begins with the screen 350 shown in FIG. 35, which includes the selections to allow margin 351 or not.

FIG. 36 shows the process 360 for adding an additional account to an existing user's account(s). The user opens the open another account page 361 and chooses an account type 362. If the account type does not permit margin, e.g., a 401(k) account, the user is informed that the account type does not permit margin 364. If the type does permit margin, the system defaults yes on the money fund page 363. Again, the process 360 starts with the screen 370 shown in FIG. 37, which enables the user to select using margin 371 or not.

FIG. 38 shows the process 380 for modifying one's margin profile. Starting from the My Accounts screen 381, the user opens the My Profile screen 382 and selects the option to change the margin setting at the account level 383.

The user can add margin access 384, remove margin access 385 or avoid creating a margin account altogether 386. If any account is in a margin call, however, the system restricts the customer from adding margin to another account.

Figure 40:
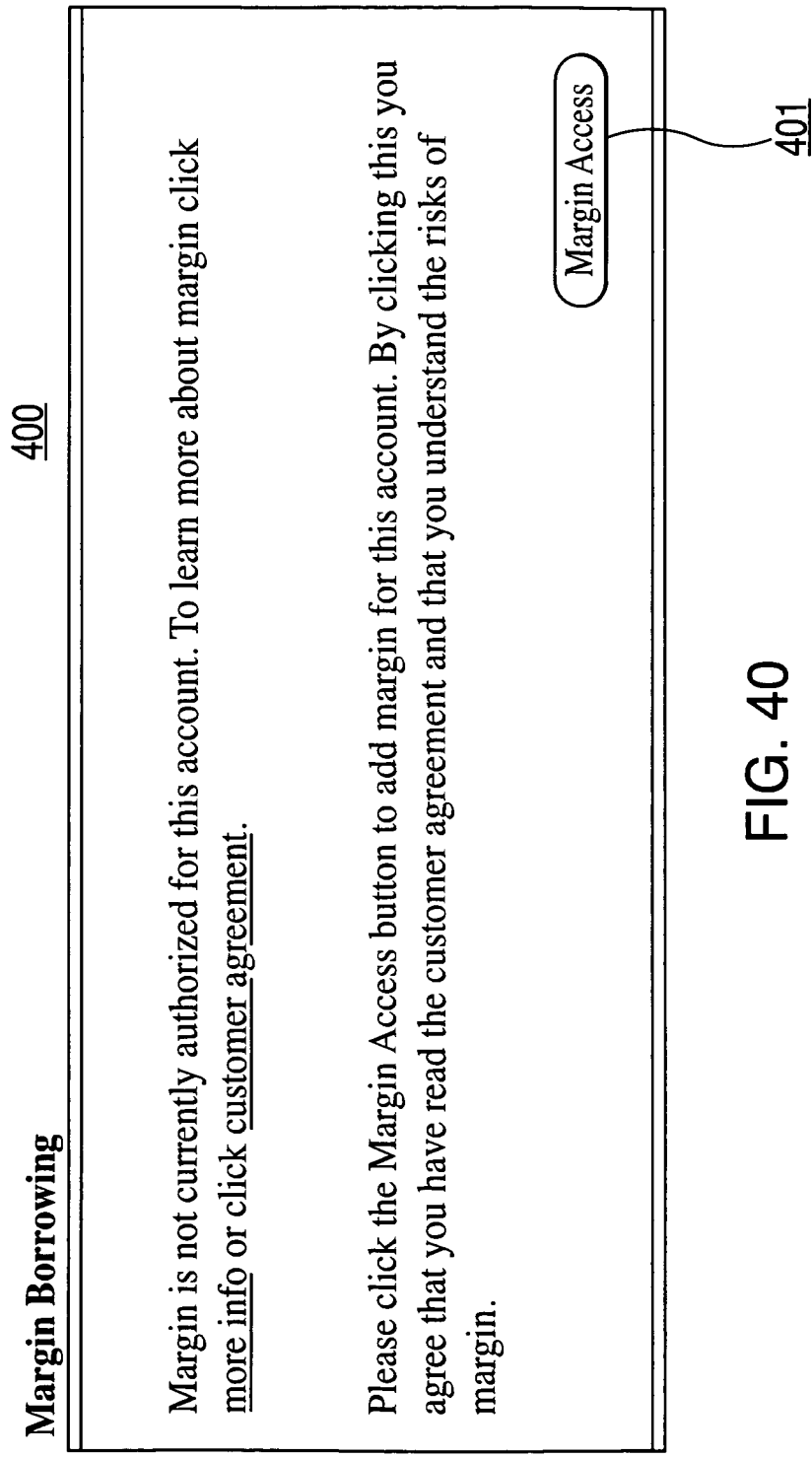
Figure 41:
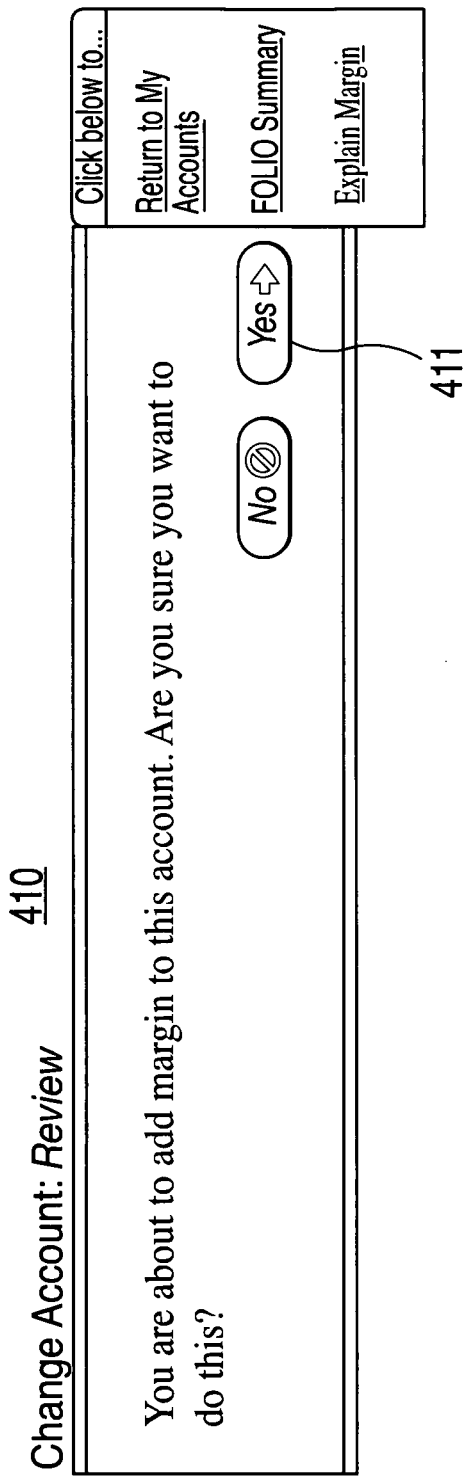

FIG. 39 shows an account information screen 390 for a customer. Clicking on the add margin link opens the screen 400 shown in FIG. 40, which informs the user that margin is currently not authorized for the given account, but enabling them to open the margin access screen 410 (FIG. 41) by clicking on the margin access button 401. Upon confirming that the user wishes to add margin by clicking on the YES button 411, the user is enabled to add margin.

FIG. 42 shows the process 420 for editing one's margin profile. The dashed blocks 424, 426 are steps not selected in this example. Starting with the My Accounts screen 421, opening the My Profile screen 422, and selecting change margin setting 423. In this case, no margin account is created 425.

Figure 45:
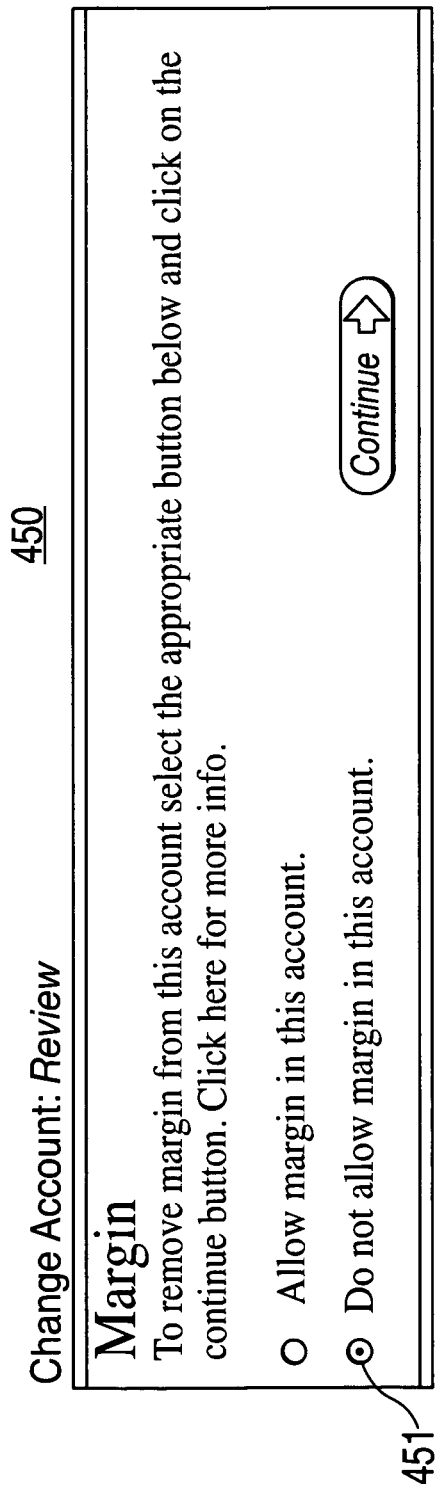

FIG. 43 shows the process 430 for removing margin access from one's margin profile. The dashed blocks 434, 436 are steps not selected in this example. Starting with the My Accounts screen 431, opening the My Profile screen 432, and selecting change margin setting 433. The user is then able to remove the margin access 435. Selecting remove margin from screen 440 of FIG. 44 enables the user to open screen 450 of FIG. 45, in which the user can select to not allow margin for this account 451.

FIG. 46 shows the process 460 for add margin access to one's profile. Starting with the My Account screen 461, the user selects My Profile 462, authorizes access 463, and grants access 464, which in turn adds margin language in margin enabled account. FIG. 47 shows the grant access screen 470.

FIG. 48 shows the process 480 for viewing the account summary. Starting with the My Accounts screen 481, selecting to view Account Summary 482, the user can view the available margin 483, move cash to pay the margin balance 484 and confirm these instructions 485. FIG. 49 shows the account summary screen 490 with margin balance (e.g., $5000). FIG. 50 shows the view summary screen 500, which shows the margin balance 501, the amount available for borrowing 502, the buying power 503, the total margin balance 504 and the total value 505.

Figure 51:
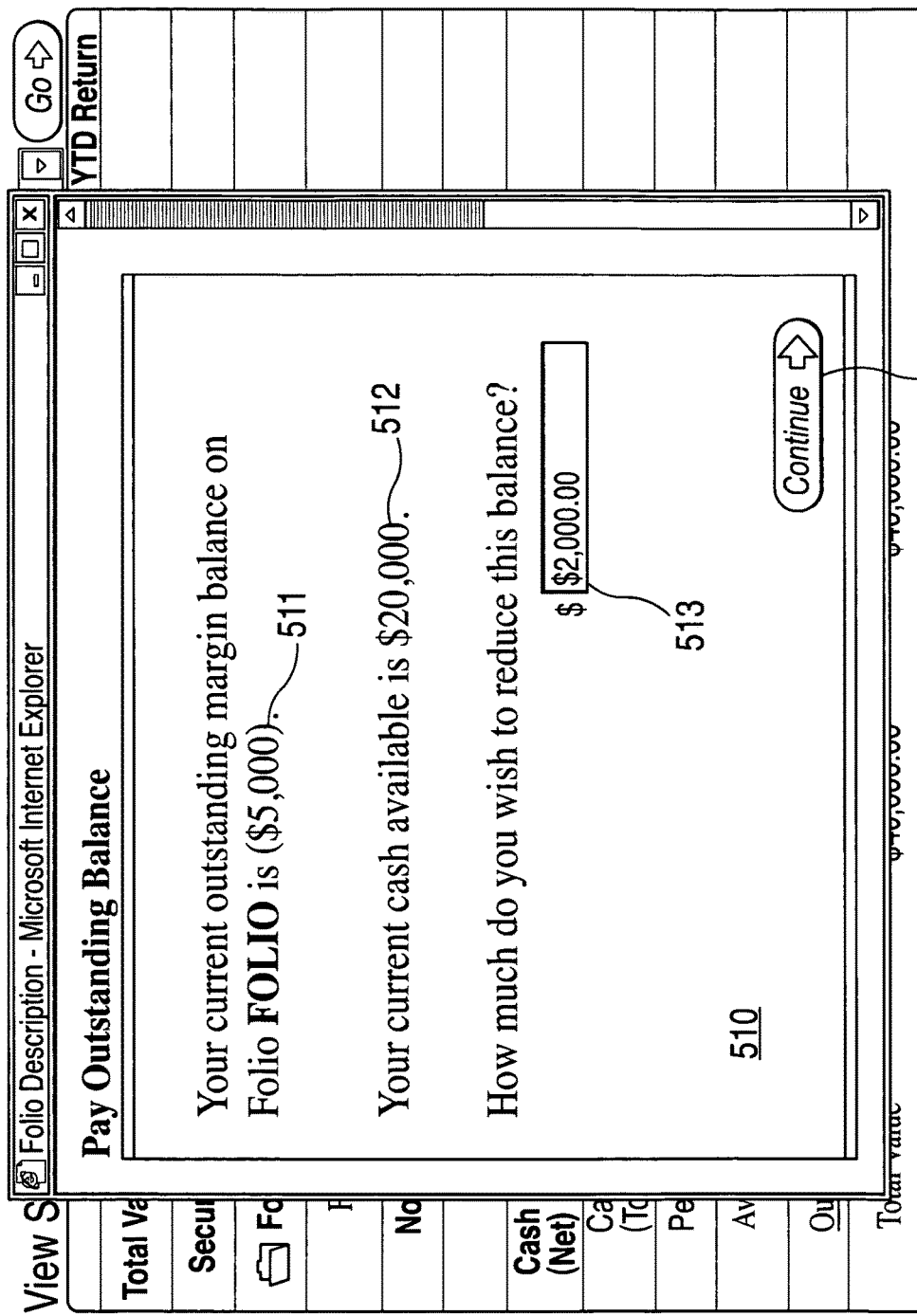
Figure 52:
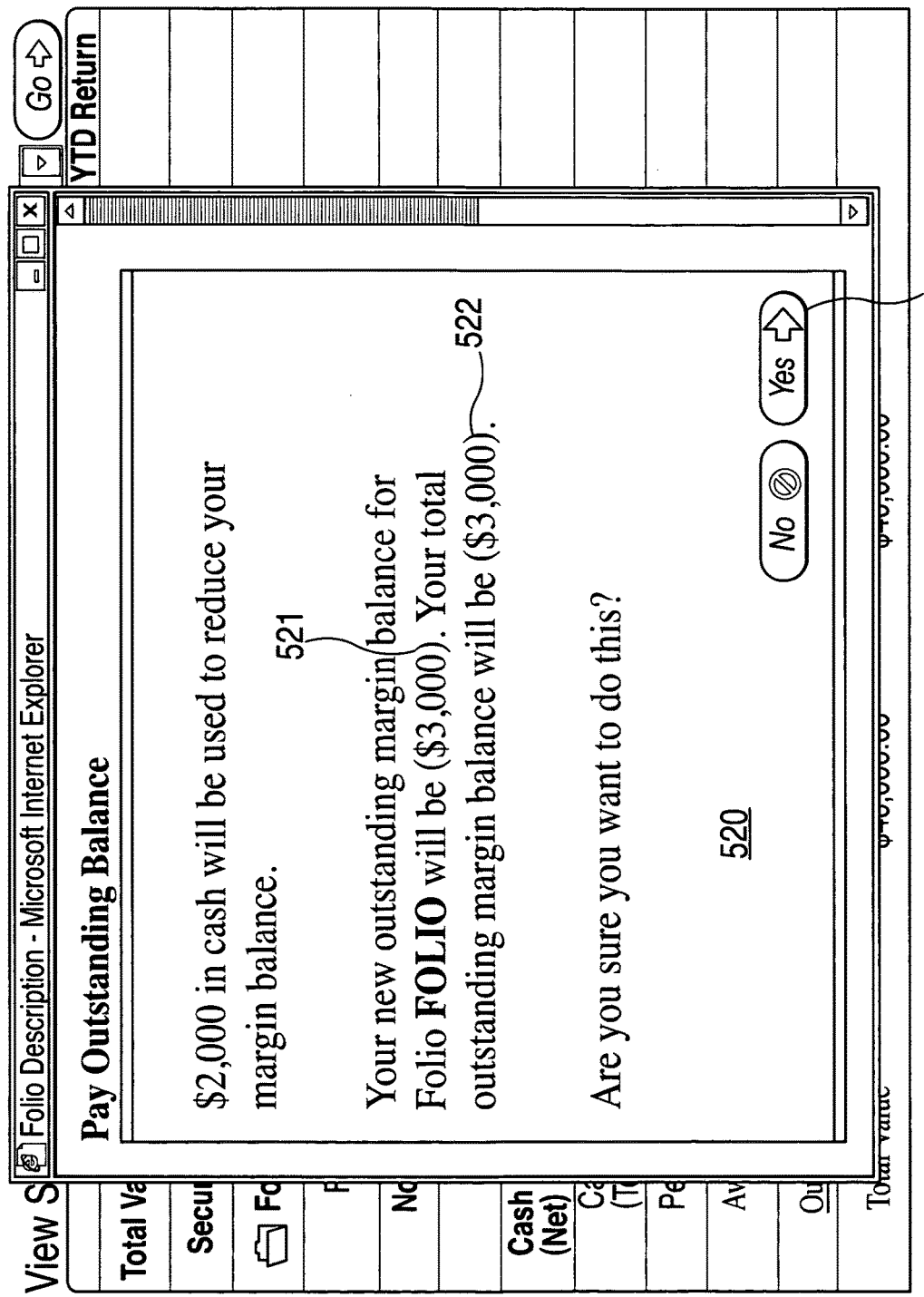

FIG. 51 shows the pay outstanding margin screen 510, which shows the outstanding margin balance 511, the current available cash 512, and a field 513 in which the user can enter the amount by which to reduce the margin balance and click on the continue button 514 to proceed. FIG. 52 shows the screen 520 indicating the results of the user's selections in FIG. 51, which screen 520 shows the new outstanding margin balance 521, the total margin balance 522 (for all accounts). To proceed, the user clicks on the continue button 523.

Figure 57:
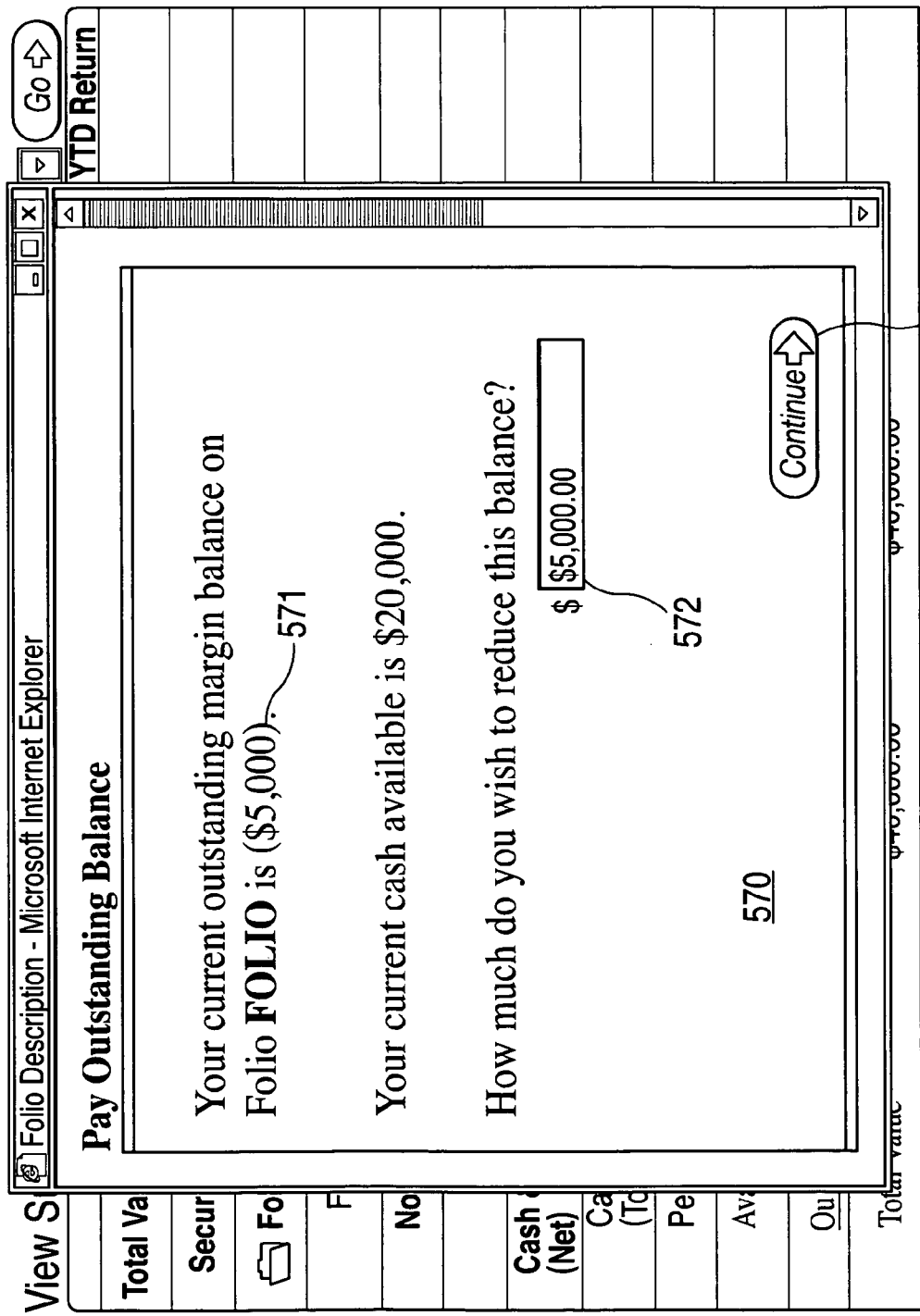
Figure 58:
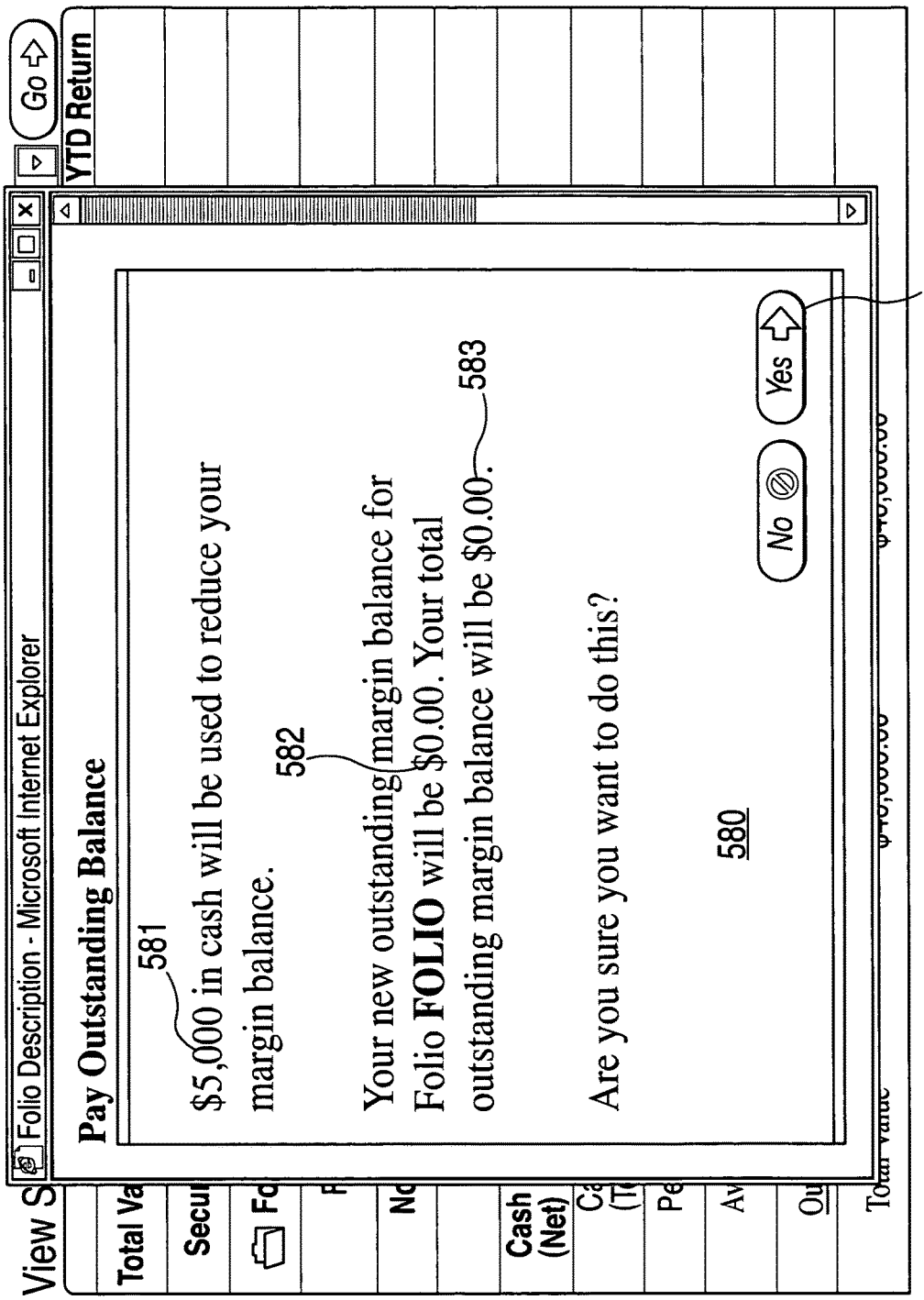

FIG. 54 shows the process 540 for viewing the Margin and Folio summary. Starting with the My Accounts screen 541, selecting to view Folio Summary 542, the user can view the available margin 543, move cash to pay the margin balance 544 and confirm these instructions 545. FIG. 55 shows the folio summary screen 550 with outstanding margin balance (e.g., $15,000). Screen 560 in FIG. 56 shows the current market value of the folio with the outstanding margin balance (current 561, and previous close 562). A link 563 to reduce margin balance is provided on screen 560, which link 563 opens screen 570 of FIG. 57, which shows the current margin balance of this folio 571, the available cash and a field 572 into which the user can input the amount by which to reduce the outstanding margin balance. Clicking on the continue button 573 takes the user to screen 580 of FIG. 58, which describes in words the user's selections indicating the amount used to reduce the margin balance 581, the resulting margin balance for this folio 582, and the total margin balance for all account 583. Clicking on the continue button 584 implements these instructions.

Figure 59:
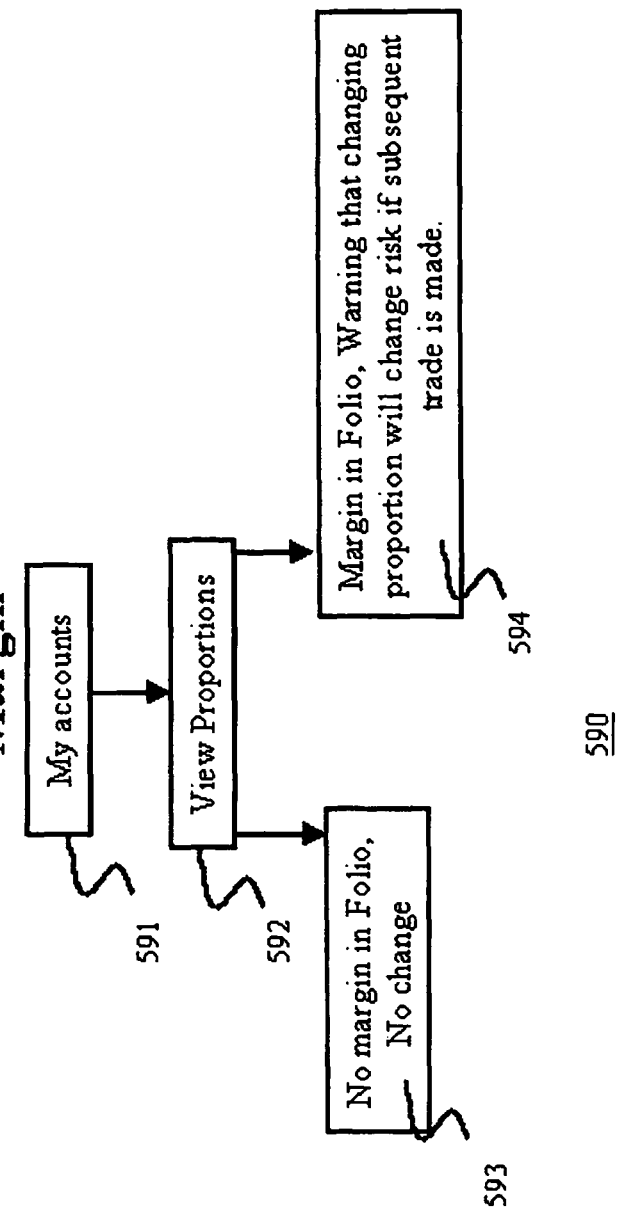
FIG. 59 depicts an exemplary embodiment of a flow chart of web pages for interacting with a user to enable a user to view/change the user's proportion and margin when managing a portfolio of assets, rights and/or liabilities as part of a graphical user interface for use in the apparatus of FIG. 3 according to another aspect of the present invention.

FIG. 59 shows the process 590 for viewing/changing the proportion and Margin. Starting with the My Accounts screen 591, selecting to view Proportions 592, the user can select to not change the proportions 593, or to change the proportions 594. If changing the proportions, the user is informed that subsequent trades are made, the underlying risk will be changed.

Figure 60:
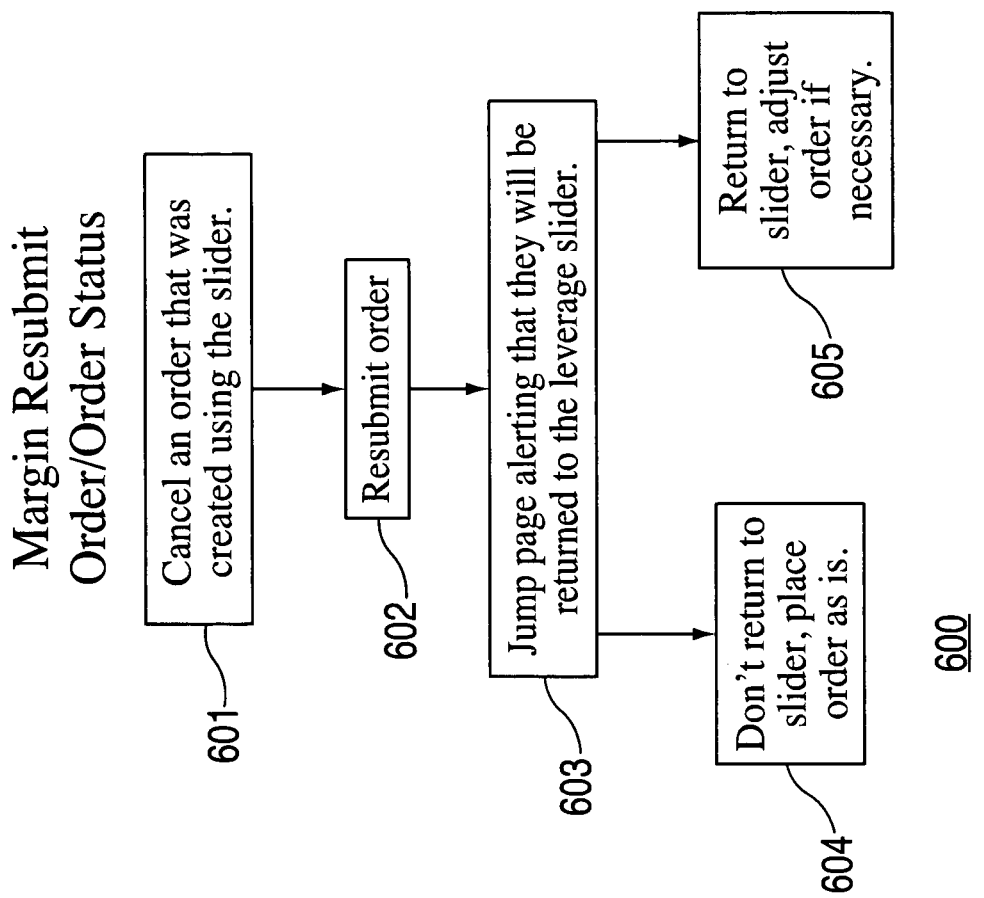
FIG. 60 depicts an exemplary embodiment of a flow chart of web pages for interacting with a user to enable a user to determine a status of or resubmit an order to trade a portfolio of assets, rights and/or liabilities using leverage as part of a graphical user interface for use in the apparatus of FIG. 3 according to another aspect of the present invention.

FIG. 60 shows the process 600 for resubmitting a margin order or for obtaining a margin order status. If the user wishes to cancel an order created using the margin slider 601, the user selects resubmit order 602, which opens a jump page indicating to the user that the user will be take to the margin slider page 603, which allows the user to select whether to return to the leverage slider and adjust, if desired or necessary, 605 or not 604 and place order as is. FIG. 61 shows an order status screen 610, which shows a trade with a margin purchase 611.

SUMMARY

Although various embodiments are specifically illustrated and described herein, it will be appreciated that modifications and variations of the invention are covered by the above teachings and within the purview of the appended claims without departing from the spirit and intended scope of the invention. For example, while several of the predetermined investment portfolios are discussed, other predetermined investment portfolios will suffice without departing from the scope of the present invention. Moreover, while specific less risky investment vehicles, such as cash reserves, are discussed, other less risky investment vehicles will suffice to implement the embodiments described herein. These examples should not be interpreted to limit the modifications and variations of the invention covered by the claims but are merely illustrative of possible variations.

What is claimed is:

1. A method for enabling a user to create a leveraged portfolio trading order for a portfolio of a plurality of assets, rights or liabilities to be purchased with a user specifiable amount of leverage and to display an effect of the user specifiable amount of leverage on a potential return for the portfolio and enabling the user to purchase the portfolio of the plurality of assets, rights or liabilities using the user specifiable amount of leverage, said method comprising:

displaying by a graphical user interface an interactive web page;

providing on the interactive web page a leverage slider which enables a user to adjust an amount of leverage when purchasing a first portfolio comprised of a first plurality of assets, rights or liabilities by adjusting a graphical image in the leverage slider being displayed on the interactive web page to indicate a user specified amount of leverage;

displaying by said graphical user interface on the interactive web page a plot of an estimated range of returns of the first portfolio using the user specified amount of leverage in the graphical image in the leverage slider;

modifying by said graphical user interface the plot of the estimated range of returns in response to a user adjustment of the graphical image in the leverage slider being displayed on the graphical user interface to indicate the user specified amount of leverage;

providing by said graphical user interface a selectable indicator to enable the user to submit a first leveraged portfolio trading order for the first portfolio of the first plurality of assets, rights or liabilities with a first user specified amount of leverage equal to the user specified amount of leverage currently indicated by the graphical image in the leverage slider being displayed on the graphical user interface;

receiving by a computer the first leveraged portfolio trading order to trade the first plurality of assets, rights or liabilities using the first user specified amount of leverage equal to the user specified amount of leverage currently indicated by the graphical image in the leverage slider being displayed on the graphical user interface, said first leveraged portfolio trading order including a first list of the first plurality of assets, rights or liabilities to be traded and a first dollar amount associated with each of the first plurality of assets, rights or liabilities in the first list, wherein a first total dollar amount of the first leveraged portfolio trading order equals the user specified amount of leverage plus a first amount of funds to be supplied by the user;

receiving by said computer a second plurality of portfolio trading orders to trade a second plurality of portfolios comprised of a second plurality of assets, rights or liabilities from a plurality of other users, each of the second plurality of portfolio trading orders including a second list of the second plurality of assets, rights or liabilities to be traded and a second dollar amount associated with each of the second plurality of assets, rights or liabilities in the second list;

receiving by said computer from at least one of the other users a second leveraged portfolio trading order among the second plurality of portfolio trading orders to trade at least one of the second plurality of portfolios using a second user specified amount of leverage, wherein a second total dollar amount of the second leveraged portfolio trading order equals a second user specified amount of leverage plus second funds to be supplied by the other user;

converting by said computer the first leveraged portfolio trading order and the second plurality of portfolio trading orders, including the second leveraged portfolio trading order, into a plurality (m) of individual orders for each of the assets, rights or liabilities in each of the first leveraged portfolio trading order and the second plurality of portfolio trading orders, including the second leveraged portfolio trading order;

converting by said computer the plurality of individual orders (m) for each of the assets, rights or liabilities into one or more fewer (n) individual orders for each of the plurality of assets, rights or liabilities, wherein $1<n<m$, by aggregating one or more orders for a same asset, right or liability into a single order for the same asset, right or liability; and forwarding by said computer over a network the one or more fewer orders of assets, rights or liabilities to one or more other computers for a market for each of the same assets, rights or liabilities in the fewer order of assets, rights or liabilities.

2. The method according to claim 1, further comprising receiving by the computer the user specified amount of leverage from the user who adjusts a slider bar in the graphical user interface to a desired equity to margin ratio.

3. The method according to claim 1, wherein the graphical image includes a slider bar.

4. The method according to claim 1, wherein the graphical image includes an arrow on a dial.

5. The method according to claim 1, further comprising adjusting the graphical image by entering a numeric amount in a blank field.

6. The method according to claim 1, further comprising adjusting the graphical image by clicking on an up or down arrow to increase or decrease a default numerical amount.

7. An apparatus for enabling a user to create a leveraged portfolio trading order for a portfolio of a plurality of assets, rights or liabilities to be purchased with a user specifiable amount of leverage and to display an effect of the user specifiable amount of leverage on a potential return for the portfolio and enabling the user to purchase the portfolio of the plurality of assets, rights or liabilities using the user specifiable amount of leverage, said apparatus comprising:

a processor;

a graphical user interface; and a non-transitory computer readable media having a plurality of instructions encoded thereon to cause the processor to:

display via the graphical user interface an interactive web page;

provide on the interactive web page a leverage slider which enables a user to adjust an amount of leverage when purchasing a first portfolio comprised of a first plurality of assets, rights or liabilities by adjusting a graphical image in the leverage slider being displayed on the interactive web page to indicate a user specified amount of leverage;

display via said graphical user interface on the interactive web page a plot of an estimated range of returns of the first portfolio using the user specified amount of leverage in the graphical image in the leverage slider;

modify via said graphical user interface the plot of the estimated range of returns in response to a user adjustment of the graphical image in the leverage slider being displayed on the graphical user interface to indicate the user specified amount of leverage;

provide via said graphical user interface a selectable indicator to enable the user to submit a first leveraged portfolio trading order for the first portfolio of the first plurality of assets, rights or liabilities with a first user specified amount of leverage equal to the user specified amount of leverage currently indicated by the graphical image in the leverage slider being displayed on the graphical user interface;

receive the first leveraged portfolio trading order to trade the first plurality of assets, rights or liabilities using the first user specified amount of leverage equal to the user specified amount of leverage currently indicated by the graphical image in the leverage slider being displayed on the graphical user interface, said first leveraged portfolio trading order including a first list of the first plurality of assets, rights or liabilities to be traded and a first dollar amount associated with each of the first plurality of assets, rights or liabilities in the first list, wherein a first total dollar amount of the first leveraged portfolio trading order equals the user specified amount of leverage plus a first amount of funds to be supplied by the user;

receive a second plurality of portfolio trading orders to trade a second plurality of portfolios comprised of a second plurality of assets, rights or liabilities from a plurality of other users, each of the second plurality of portfolio trading orders including a second list of the second plurality of assets, rights or liabilities to be traded and a second dollar amount associated with each of the second plurality of assets, rights or liabilities in the second list;

receive from at least one of the other users a second leveraged portfolio trading order among the second plurality of portfolio trading orders to trade at least one of the second plurality of portfolios using a second user specified amount of leverage, wherein a second total dollar amount of the second leveraged portfolio trading order equals a second user specified amount of leverage plus second funds to be supplied by the other user;

convert the first leveraged portfolio trading order and the second plurality of portfolio trading orders, including the second leveraged portfolio trading order, into a plurality (m) of individual orders for each of the assets, rights or liabilities in each of the first leveraged portfolio trading order and the second plurality of portfolio trading orders, including the second leveraged portfolio trading order;

convert the plurality of individual orders (m) for each of the assets, rights or liabilities into one or more fewer (n) individual orders for each of the plurality of assets, rights or liabilities, wherein 1<n<m, by aggregating one or more orders for a same asset, right or liability into a single order for the same asset, right or liability; and forward over a network the one or more fewer orders of assets, rights or liabilities to one or more computers for a market for each of the same assets, rights or liabilities in the fewer order of assets, rights or liabilities.

8. The apparatus according to claim 7, wherein the processor receives the user specified amount of leverage from the user who adjusts a slider bar in the graphical user interface to a desired equity to margin ratio.

9. The apparatus according to claim 7, wherein the graphical image includes a slider bar.

10. The apparatus according to claim 7, wherein the graphical image includes an arrow on a dial.

11. The apparatus according to claim 7, wherein the adjusting the graphical image includes entering a numeric amount in a blank field.

12. The apparatus according to claim 7, wherein adjusting the graphical image includes clicking on an up or down arrow to increase or decrease a default numerical amount.

* * * * *